(12) United States Patent
Buhler et al.

(10) Patent No.: US 7,947,918 B2
(45) Date of Patent: May 24, 2011

(54) METHOD AND GENERATOR FOR ELECTRICAL DISCHARGE MACHINING

(75) Inventors: Ernst Buhler, Losone (CH); Franck Besson, Fillinges (FR); Rino D'Amario, Sigirino (CH); Nicola Giandomenico, Troinex (CH); Reto Knaak, Ascona (CH)

(73) Assignees: Agie Charmilles SA, Losone (CH); Charmilles Technologies SA, Meyrin (CH)

( * ) Notice: Subject to any disclaimer, the term of this patent is extended or adjusted under 35 U.S.C. 154(b) by 1238 days.

(21) Appl. No.: 11/497,029

(22) Filed: Jul. 31, 2006

(65) Prior Publication Data
US 2007/0023400 A1 Feb. 1, 2007

(30) Foreign Application Priority Data
Aug. 1, 2005 (EP) .................................. 05016701

(51) Int. Cl.
*B23H 1/02* (2006.01)
(52) U.S. Cl. .................................................. 219/69.18
(58) Field of Classification Search ............... 219/69.13, 219/69.18; 320/166, 167
See application file for complete search history.

(56) References Cited

U.S. PATENT DOCUMENTS

| 2,895,080 | A |   | 7/1959  | Branker |
|-----------|---|---|---------|---------|
| 4,072,842 | A |   | 2/1978  | Ullmann et al. |
| 4,310,741 | A |   | 1/1982  | Inoue |
| 4,710,603 | A |   | 12/1987 | Obara |
| 4,766,281 | A |   | 8/1988  | Buhler |
| 4,864,092 | A | * | 9/1989  | Obara ........................ 219/69.18 |
| 5,380,975 | A |   | 1/1995  | Sato et al. |
| 5,399,825 | A | * | 3/1995  | Valenzuela ................. 219/69.13 |
| 6,072,701 | A | * | 6/2000  | Sato et al. ........................ 363/17 |
| 6,281,463 | B1 |  | 8/2001  | Kaneko et al. |
| 6,525,287 | B2 |  | 2/2003  | Lin |
| 2004/0094515 | A1 | * | 5/2004 | Goto et al. ................. 219/69.12 |

FOREIGN PATENT DOCUMENTS

| EP | 1116541 A1   |   | 7/2001  |
|----|--------------|---|---------|
| JP | 59059319     |   | 4/1984  |
| JP | 61-164718 A  | * | 7/1986  |
| JP | 1-23777 A    | * | 1/1989  |
| JP | 7-148275 A   | * | 6/1995  |
| JP | 10-128620 A  | * | 5/1998  |
| JP | 10-217032 A  | * | 8/1998  |
| RU | 2191466 C2   | * | 10/2002 |

* cited by examiner

*Primary Examiner* — Geoffrey S Evans
(74) *Attorney, Agent, or Firm* — Harness, Dickey & Pierce, P.L.C.

(57) ABSTRACT

The invention relates to a method and a generator for generating a time sequence of discharge pulses separated from each other by pulse pauses for electrical discharge machining. At least two pulse capacitors are discharged each in the form of a partial pulse into the spark gap for forming together a discharge pulse. A discharge pulse having a predetermined waveform is selected from a plurality of discharge pulses having differing predetermined waveforms. The discharge of the at least two pulse capacitors is controlled such that the selected discharge pulse is generated with the predetermined waveform.

24 Claims, 19 Drawing Sheets

METHOD AND GENERATOR FOR ELECTRICAL DISCHARGE MACHINING

FIELD OF THE INVENTION

The invention relates generally to the field of machine tools, and more specifically the invention relates to a method of operating a machine tool and a machine tool, in particular to a method and a generator for electrical discharge machining (EDM), particularly for wire cutting and die sinking.

BACKGROUND OF THE INVENTION

Shown in FIG. 2 is the general configuration of a known type of EDM die sinking machine. A wire cutting machine differs from a die sinking machine actually only in details, but nevertheless most manufacturers make use of totally different concepts for the two types of machines. This applies particularly to the pulse generator involved, where very short but high discharge pulses are needed for wire cutting, whilst for die sinking longer discharge pulses of corresponding lower amplitude are used. To date there is still no satisfactory solution for a consistent overall concept.

The configuration of an EDM system generally involves the sub-systems: AC mains input 1, power cabinet 2, cable system 3 and machine 4. The power cabinet 2 houses an AC voltage module (AC), a DC voltage module (DC), a numerical control (CNC), one or more drive modules (Drive), a generator module (Gen.) as well as a universal machine control module (Control). Since the full content of the power cabinet 2 is considerably bulky and weighty and the total power loss is of the order of a single-digit KW, the power cabinet is normally sited some distance away from the machine 4.

The cable system 3 is usually 2 m to 5 m long. A first cable connects the drive modules (Drive) to the axis drive motors of the machine 4 and supplies the motor current, the current for any brakes as may be provided as well as diverse sensitive digital signals of the position transducers. These cables are a significant cost factor and if not designed with due care can easily result in expensive downtime.

A second cable connects the generator module (Gen.) to the work piece and to the electrode of the machine 4. This second cable has the disadvantage that the power losses, particularly in wire cutting, due to the high RMS value of the pulse current may be as high as 100 W/m. Apart from this undesirable waste of energy this can also result in the machine structure becoming twisted from the heat and thus to work piece inaccuracies. Currently, the only solution to this problem is a complicated means of water cooling.

Another disadvantage is also involved in the high rigidity of the cables used, typically needing to involve eight coaxial cables in parallel, each of approximately 5 mm² copper section. Since the cables are connected to moving structure parts of the machine, their rigidity results in flexing of these structure parts in the micrometer range and thus, of course, to corresponding errors in work piece machining.

A third cable serves to connect the universal machine control module (Control) to a large number of function units on the machine 4, such as electrovalves, pumps, auxiliary drives, end switches, temperature sensors, safety guards, etc. This third cable likewise results in considerably costs because a great many different conductors are needed, but also because each machine variant needs ultimately a special cable. A further disadvantage materializes when the machine 4 and the power cabinet 2 are shipped separately to the customer, the many connections of the cable system 3 required on installation constituting an added fault risk.

In the Proceedings of the 13th ISEM Vol. 1, Bilbao 2001, pages 3 to 19 all processes and equations fundamental to pulse generation via pulse capacitors are explained as regards their application in micro EDM. These comments apply in general and thus also to the present invention.

In the Proceedings of the 13th ISEM Vol. 1, Bilbao 2001, pages 153 to 160 a dual half-bridge type non-resistive generator is explained. This generator is designed so that each half-bridge can generate symmetrical delta currents. When suitably controlled, the sum of the currents of the two half-bridges is a zero-ripple trapezoidal pulse. By pulse width modulation with a signal representing the current shape within the range of the rise and fall times of the delta currents a great variety of desired current shape can be synthesized. Since only half-bridges are provided, the pulse shape at the output can correspondingly only be monopolar. Although eliminating the load resistors improves efficiency, this is almost instantly reduced because of the commutations during the current peaks. This disadvantage becomes all the more serious the higher the pulse current and the frequency are selected. When such a generator is used for generating steep pulses, as is usual, high frequencies are necessarily required. A further problem lies in a disadvantage of the bridge circuit itself, namely in the existence of switching elements between the work piece and the power supply, it being between these points that the steep commutation flanks result in high displacement currents at the AC mains side, ultimately resulting in poor electromagnetic compatibility. For the same reason, the two sources need to be DC decoupled from each other which unnecessarily adds to the costs of the configuration.

U.S. Pat. No. 4,710,603 discloses a generator, operating on the pulse capacitor discharge principle, the basic circuit of which is shown in FIG. 3. From a DC voltage source E a capacitor C1 is charged via a switching element Q1 and an inductance L3. A further switching element Q2 discharges the pulse capacitor C1 via a further inductance L2 into the spark gap PW. This circuit requires neither charge resistors nor switching elements in linear operation.

U.S. Pat. No. 4,766,281 discloses a generator with a passive charging voltage regulator as shown in FIG. 4. The charging voltage regulator comprises a flyback converter transformer and two diodes. The efficiency of this generator is high since the commutation losses as occur with the generator as it reads from U.S. Pat. No. 4,710,603 across the switching element Q1 are eliminated.

However, both generators still have disadvantages. Firstly, the pulse frequency is restricted to modest values of around 70 kHz due to monopolar charging. Increasing the frequency further would allow the charge current to increase to values adversely affecting the efficiency. Secondly, the generators are still too large to permit their location e.g. in the direct vicinity of the electrode. For a more detailed explanation of this, reference is made to FIG. 5 plotting for these generators the curves of the capacitor voltage Uc and pulse current Igap at the spark gap as a function of time t. It is evident that for a sinusoidal pulse current Igap the negative charging voltage U_chrg flips cosinusoidally to a positive residual charging voltage U_end. This residual charging voltage U_end corresponds precisely to the energy which is not converted in the spark gap and reflected back to the pulse capacitor. Ignoring the line losses the residual charging voltage as it reads from the aforementioned Proceedings of the 13th ISEM Vol. 1, Bilbao 2001, pages 3 to 19 is:

$$U\_end = -U\_chrg + 2*U\_gap \quad (1)$$

where U_gap corresponds to the voltage across the spark gap. The residual voltage U_end is accordingly a function of neither the pulse current nor of the capacitance of the pulse capacitor, nor of the inductance of the discharge circuit. After a discharge the charging voltage regulator immediately commences to recharge the pulse capacitor again to the desired negative charging voltage U_chrg. In this arrangement, the complete electrical energy of the residual charging voltage U_end is converted within an inductance (e.g. within the coil L3 in FIG. 3 or within the flyback converter transformer in FIG. 4) firstly into magnetic energy, before then being stored again in form of electrical energy in the pulse capacitor in reverse polarity.

U.S. Pat. No. 6,525,287 B2 discloses a further generator including a plurality of capacitors for pulse generating. The capacitors are inserted in the cross-branch of a full bridge in AC operation. The main idea of this invention is replacing the load resistors by the lossless AC impedance of the capacitors. Here, however, the switching elements of the full bridge need to commutate practically the total load current with high losses otherwise the ripple on the current would be 100% and a considerable amount of energy is inductively stored in the cable system. To safely handle such amounts of energy additional lossy safety circuits are needed.

U.S. Pat. No. 5,380,975 discloses a generator including a plurality of pulse capacitors which are simultaneously discharged by switching elements into the spark gap. This results in an increase in the capacitance as compared to that of a single pulse capacitor and the discharge energy can be maintained at a prescribed level.

U.S. Pat. Nos. 4,072,842 and 6,281,463 show generators wherein ignition voltage sources are connected via diodes to a switching mode type generator for making available a selective high ignition voltage at the spark gap whilst retaining a minimized switching frequency of the pulse current regulator. All ignition sources of these generators comprise load resistors and are unable, for example, to regulate the pulse current or otherwise influence its shape. Although generators of this kind were an advancement as long as the ignition voltage source was only used to generate a voltage (i.e. essentially without current) when attempting to also use the ignition voltage source for generating the smaller discharge currents (problematic for DC regulators because of the switching frequency being too high), however, the principle produced an unwanted drop in efficiency.

The object of the invention is to provide a method and a generator for generating a variety of different waveforms for the discharge pulses.

SUMMARY OF THE INVENTION

A first aspect of the present invention is directed to a method of generating a time sequence of discharge pulses separated from each other by pulse pauses for electrical discharge machining. At least two pulse capacitors are discharged each in the form of a partial pulse into the spark gap for forming together a discharge pulse. A discharge pulse having a predetermined waveform is selected from a plurality of discharge pulses having differing predetermined waveforms. The discharge of the two pulse capacitors is controlled such that said selected discharge pulse is generated with said predetermined waveform.

A second aspect of the invention is directed to a generator for generating a time sequence of discharge pulses separated from each other by pulse pauses for electrical discharge machining. The generator comprises at least two pulse capacitors for generating one partial pulse each. Coupled to the pulse capacitors is a discharge controller which controls the discharge of said pulse capacitors into a spark gap for forming together a discharge pulse. The generator comprises a selecting means for selecting a discharge pulse having a predetermined waveform from multiple discharge pulses having differing waveforms. The discharge controller controls the discharging of the two pulse capacitors such that the selected discharge pulse is generated having the predetermined waveform.

BRIEF DESCRIPTION OF THE DRAWINGS

Embodiments of the invention will now be described, by way of example, and with reference to the accompanying drawings, in which.

DESCRIPTION OF THE PREFERRED EMBODIMENTS

Figure 1:
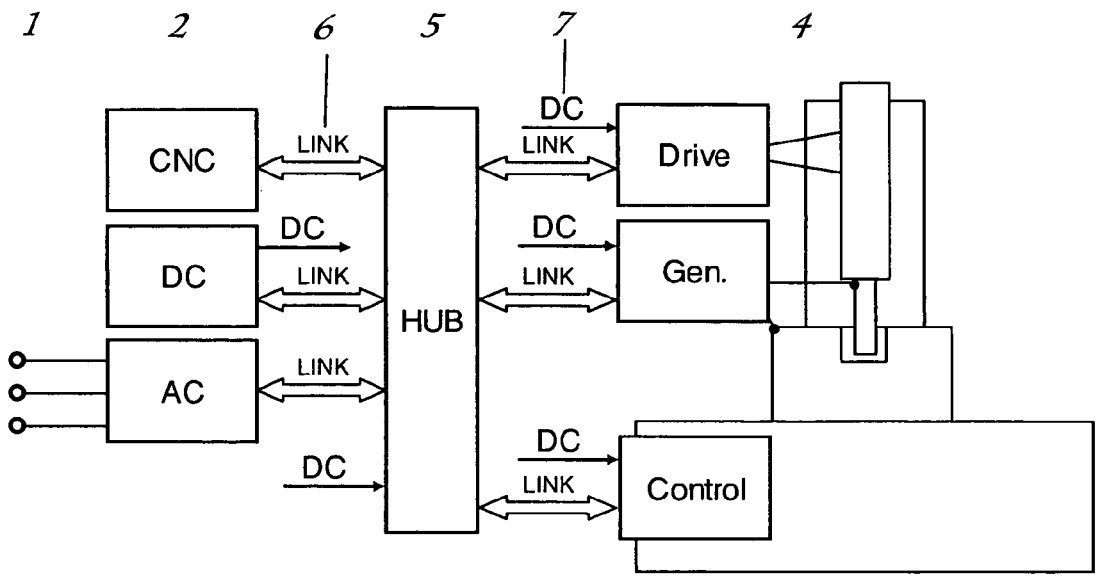
FIG. 1 is a schematic diagram of a die sinking machine of an embodiment of the invention.

FIG. 1 illustrates the main modules of a die sinking machine which in this arrangement too, can be sub-divided into known modules, an AC mains input 1 with the subsequent AC module and a DC module. The power cabinet 2 is now considerably smaller, however, and can be housed in an operator console since the drive modules (Drive), the generator module (Gen.) and the universal machine control module (Control) are now all relocated in the machine 4.

Figure 2:
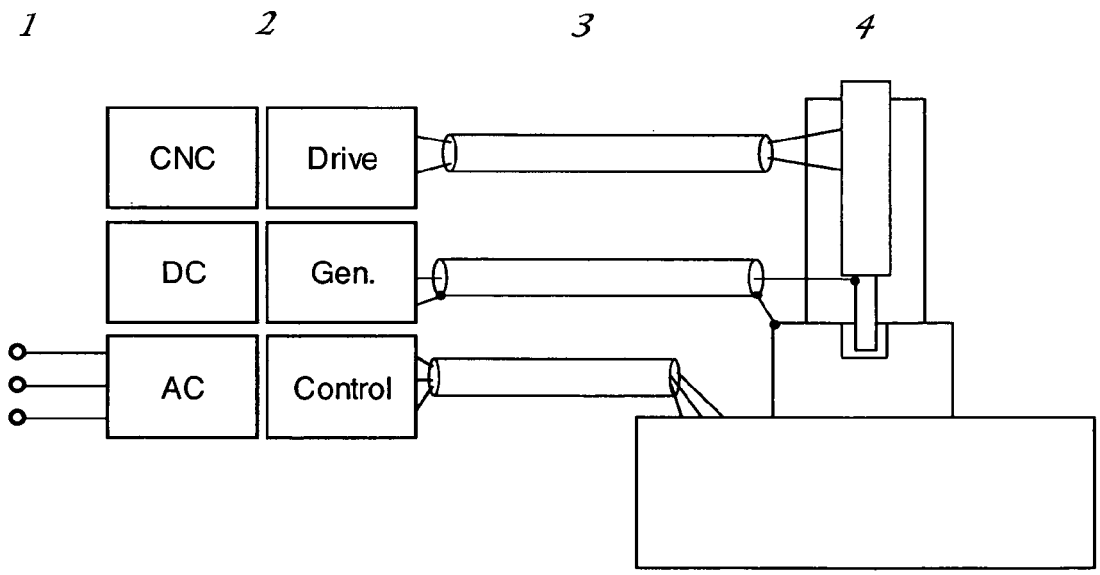
FIG. 2 is a schematic diagram of a prior art die sinking machine.
Figure 3:
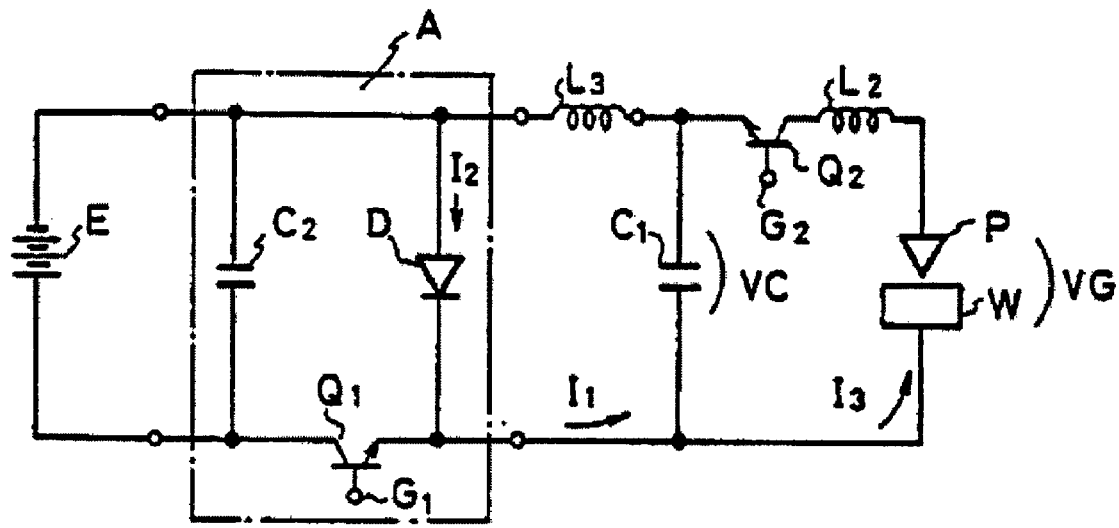
FIG. 3 is a circuit diagram of a prior art pulse capacitor discharge type generator.
Figure 4:
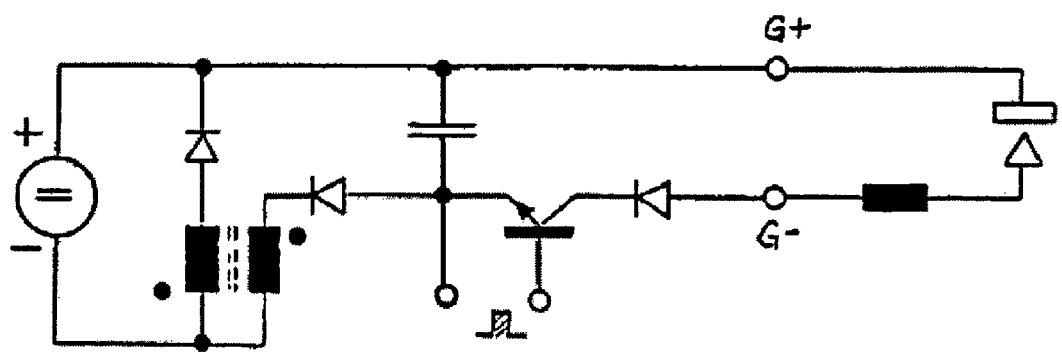
FIG. 4 is a circuit diagram of another prior art pulse capacitor discharge type generator.

The cable system 3 of FIG. 2 has been eliminated, it having been replaced by standardized data links 6 (LINK) which come together in a star configuration in a node 5. All information and commands from and to the various modules are also available for diagnostic purposes in the node 5. The node 5 is installed at a readily accessible location, but preferably on the machine 4.

The power supply of the various modules can be made directly via the data link 6 up to a wattage of approximately 50 W, standardized DC voltage cable 7 likewise being provided for higher power requirements, leading in a star-shape from the DC voltage module (DC) to the modules requiring higher power values. A DC voltage cable 7 having a section of only 1.5 mm$^2$ and a DC voltage of, for example, +/−280V is able to supply a wattage of up to 5.6 kW with no problem, just 2.3 W/m being converted into heat. Modern wire cutting generators typically require 2.2 kW mean spark wattage for cutting steel at 500 mm$^2$/min, a good 37 W/m being transformed as heat by the cable system 3 when comprising eight coaxial cables in parallel of 5 mm$^2$ each. Under these conditions a DC voltage cable 7 would transform just an ignorable 0.37 W/m into heat, i.e. 100 times less.

Extrapolating current values to 5.6 kW mean spark power would give a material removal rate of 1250 mm$^2$/min in steel, and generate a considerably power loss of 94 W/m over the known cable system 3. An alternative is given by additionally relocating the AC mains input 1, the AC module (AC) and DC module (DC) in the machine 4. In this arrangement the operator console (power cabinet 2) houses just the numerical control (CNC) and can be connected via a sole standardized data link 6 (LINK) and supplied with the necessary electrical energy. The standardized DC voltage cables 7 (DC) are thus also shorter, and merely exist internally in the machine 4.

This enormously simplifies installing such a system at the customer location, it merely requiring connecting the AC mains input 1 to the AC mains and, where necessary, plugging the data link 6 (LINK) into an operator console.

Figure 5:
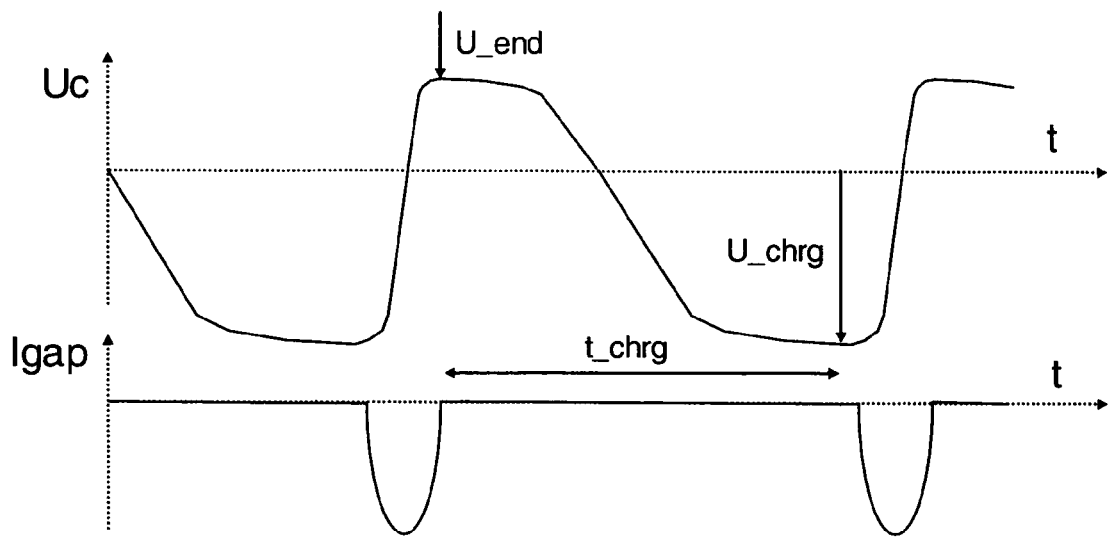
FIG. 5 are waveform diagrams of the charging voltage and discharge current in the prior art pulse capacitor discharge type generator.
Figure 6:
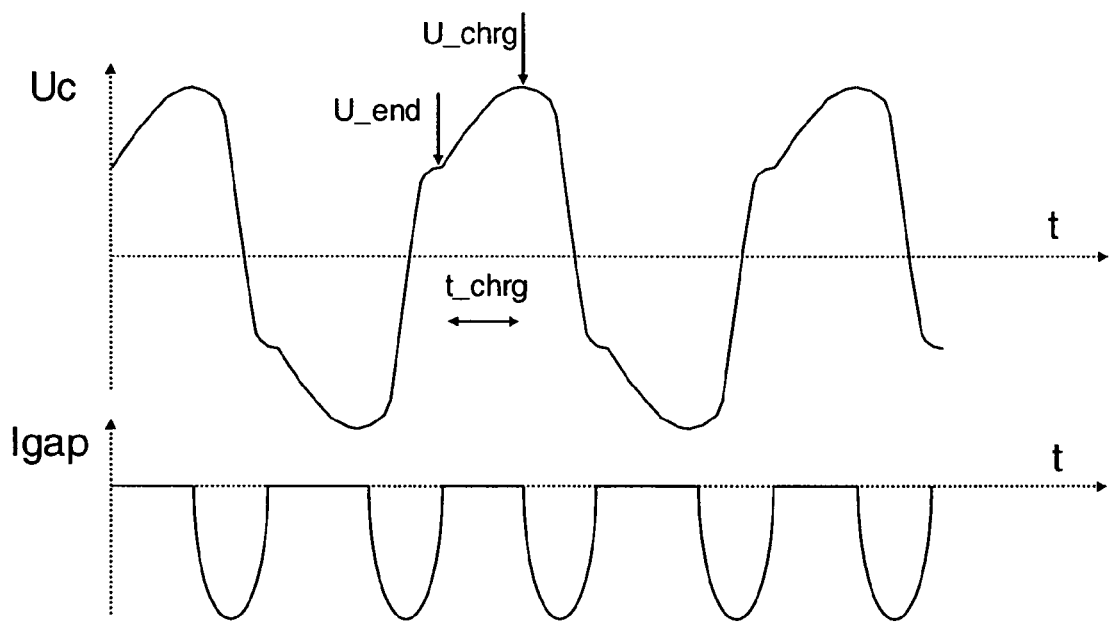
FIG. 6 are waveform diagrams of the charging voltage and discharge current in the pulse capacitor discharge type generator of an embodiment of the invention.

FIG. 6 illustrates the variation of the capacitor voltage Uc and pulse current Igap in time (herein also referred to as the waveforms of the voltage and the current) for a generator as described in the following in comparison to the waveforms for a known generator as shown in FIG. 5. For a comparable charge current the charging time t_chrg of FIG. 6 is factors shorter than that as plotted in FIG. 5, and the residual charging voltage U_end is supplemented merely by a short current pulse of correct polarity to the desired charging voltage U_chrg. The residual charging voltage U_end experiences no transformation via magnetic energy, this being the reason why it is conserved with near 100% efficiency, enabling the maximum frequency of the discharge pulses to be significantly increased.

Figure 7:
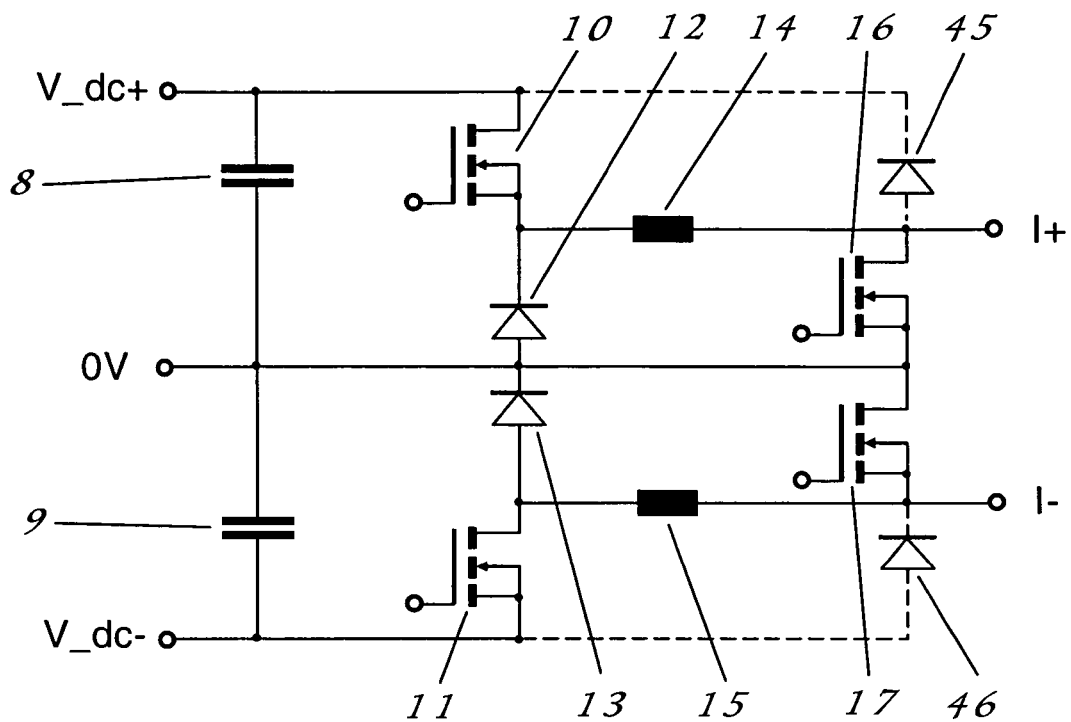
FIG. 7 is a circuit diagram of a bipolar current source of an embodiment of the invention.

FIG. 7 illustrates a charge regulator in the form of a bipolar current source 8-17 of an embodiment of the invention. The inputs V_dc+, V_dc− and the neutral 0V are supplied with a DC voltage of, for example, +/−280V from a DC voltage module (DC FIG. 1) via a standardized DC voltage cable 7. The neutral 0V roughly corresponds to ground potential with symmetrical loading which is of advantage for a high EMC of the system.

In the simplest case the DC voltage is directly obtained from the DC module (DC) via a three-phase rectifier bridge and filter capacitors from the popular 400V AC mains and requires no line isolation as such. As an alternative a three-phase active inverter bridge comprising electronic switching elements and diodes can be provided. This alternative permits achieving a wealth of additional functions such as closed loop DC control for compensating AC mains fluctuations, increasing the DC voltage above the peak AC mains, a soft start function, power factor correction (PFC), neutral 0V stabilization on asymmetrical DC loading, and DC to 400V AC mains energy return. All of these circuits are known to the person skilled in the art and require no further comments herein.

The capacitors 8 and 9 furnish the current pulses for the bipolar current source 8-17, they being provided to maintain the DC voltage cable 7 (DC) free from pulsating currents. A positive current source serves to generate a positive charging current I+. The switching elements 10 and 16 are simultaneously turned on, resulting in a linear increasing current, starting from the input V_dc+via the inductance 14 back to the 0V terminal. After a certain time, and not before the output I+ has been switched to the pulse capacitor 22 for charging (FIG. 8) the switching element 16 and, where necessary, the switching element 10 are turned off. As of this point in time the charge current I+ flows into the pulse capacitor 22 in supplementing its charging voltage. A sensor (SENS in FIG. 8) compares the charging voltage to a set value and sends a data signal to the controller (FPGA in FIG. 10) as soon as the charging voltage has attained the set value. The switching element 16 is then turned on, resulting in a sudden collapse of the charge current I+ in the pulse capacitor. If the switching element 10 was still turned on at this point in time, it is likewise turned off and the remaining residual current I+ then circulated via the diode 12, inductance 14 and the switching element 16. For furnishing a subsequent charging pulse current of the same polarity, the switching element 10 is again turned on at the suitably point in time and the procedure as described above repeated.

Since the inductance 14 acts as a current source, the charging voltage at the pulse capacitor 22 may be considerably higher than the voltage at the output V_dc+. This could, however, have detrimental consequences for the switching element 16 if this namely were to be opened live because of a malfunction before the charge current output I+ is connected to the pulse capacitor 22. This is why either transient protection diodes (not shown) are provided in parallel with the switching elements 16 and 17 or the recuperation diodes 45 and 46 can be additionally inserted between the terminals I+ and V_dc+ and I− and V_dc− respectively to restrict the charging voltage to the input voltages V_dc+ and V_dc−. If necessary, the input voltages V_dc+ and V_dc− can be increased. To generate discharge pulses of high amplitude and low duration, it is preferred to work with as high a charging voltage as possible in conjunction with a minimum capacitance of the pulse capacitor 22.

The mirror inverted configuration consisting of the switching elements 11 and 17, the diodes 13 and the inductance 15 serves to generate the negative charge current I− and functions in an analogous manner to the positive current source as described above.

The bipolar current source 8-17 as shown in FIG. 7 can be operated highly diversely. When attempting minimum losses whilst maximizing the operating frequency differing approaches may be needed in part depending on the particular application concerned.

Thus, it is preferred for good efficiency to prohibit the circulation of unnecessarily high currents in the inductances 14, 15 and diodes 12, 13 over a lengthy period of time. One alternative which prevents this is useful where the additional recuperation diodes 45, 46 are employed, by turning off the switching elements 10 and 16 or 11 and 17 on completion of having charged the pulse capacitor 22. The magnetic residual energy stored in the inductances 14 or 15 is then retrieved via the diodes 12 and 45 or 13 and 46 into the capacitors 8 and 9. This mode of operation is of advantage when a minimum pause between two charge pulses exists, otherwise it is more of an advantage to make use of the residual energy directly for the next charge pulse.

Another alternative materializes for timing the turnoff of the switching elements 16, 17 on commencement of capacitor charging. Selecting namely this point in time already during the discharge pulse, preferably when the crossover of the pulse capacitor 22 is just 0V voltage, achieves an absolutely lossless commutation. As a positive side-effect the charging time is also shortened by this arrangement. Indeed, in an extreme situation, the pulse capacitor 22 may have already reattained the set value of the charging voltage at the end of its discharge, in thus being directly available for a subsequent discharge.

To maximize the operating frequency the values for the inductances 14, 15 are minimized and the charging action of these inductances 14, 15 is initiated directly on commencement of discharge of the pulse capacitor 22. For higher charging voltages it is further of advantage to leave the switching elements 10, 11 turned on also during capacitor charging, the charging action being further shortened due to the additional energy from the capacitors 8, 9.

Figure 8:
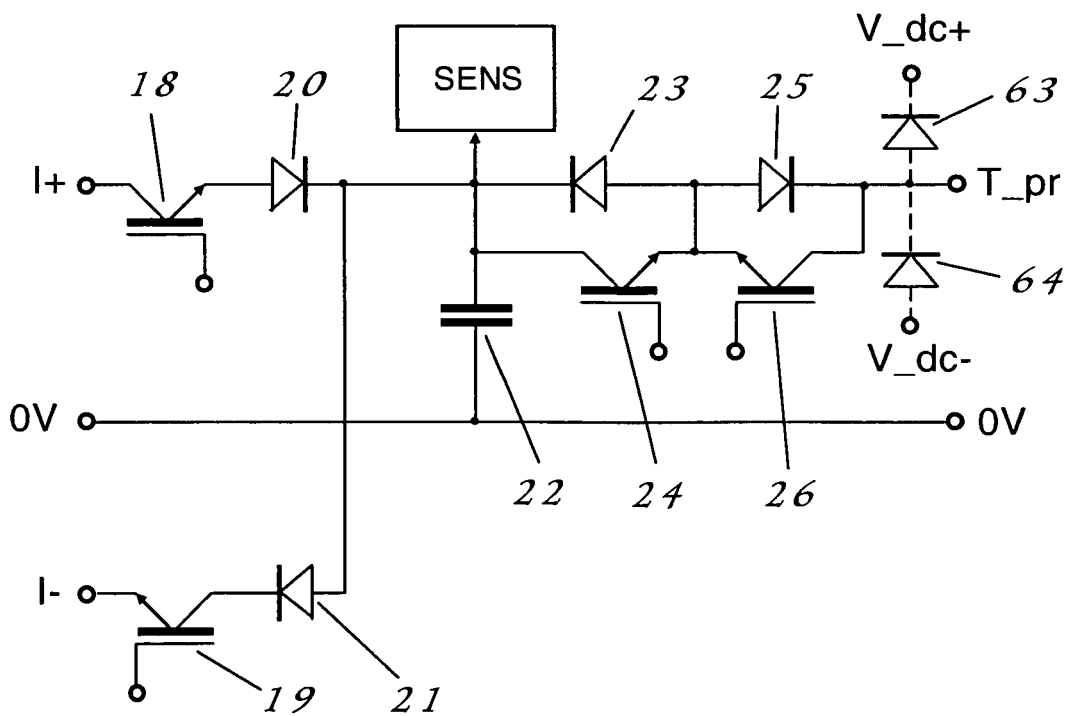
FIG. 8 is a circuit diagram of a charge/discharge circuit of an embodiment of the invention.

The charge/discharge circuit 18-26 as shown in FIG. 8 for the pulse capacitor 22 is connected via corresponding inputs I+, I− to the bipolar current source 8-17 as shown in FIG. 7. The second terminal is connected to the 0V input which in turn is connected to the neutral 0V of the bipolar current source 8-17. The switching elements 18, 19 together with the diodes 20, 21 are responsible for applying the desired polarity during charging. At the pulse capacitor 22 a sensor (SENS) continually senses the charge condition and derives therefrom various data signals. The switching elements 24 and 26 with the diodes 23 and 25 serve to discharge the pulse capacitor 22 with the correct polarity to the output T_pr.

In some embodiments additional diodes 63 and 64 are preferably provided for specific applications. In a wire cutting application, the situation may arise that an already ignited discharge is immediately extinguished due to a poor transition resistance of the wire contact or a too weak ionisation of the spark gap. If the discharge of the pulse capacitor 22 was continued its high charging voltage would lead to a forced re-ignition in the spark gap which in turn would immediately result in wire cracks. To prevent such damages the switching elements 24 or 26 are forcibly turned off and the question arises what to do with the energy stored in the various inductances of the discharge circuit. Known methods for capacitor discharge type generators provide transient protection diodes in parallel to the switching elements and adversely transform the energy into heat. Numerous occurrences of such bad discharges diminish the efficiency and may even destroy the transient protection diodes resulting in a total breakdown of the generator. In a preferred embodiment the energy is advantageously recuperated via the diodes 63, 64 and the terminals V_dc+, V_dc− into the capacitors 8, 9. Since the whole process is initiated by the central control unit (FPGA in FIG. 10) the number of these premature pulse interruptions per time unit is counted and used or issued as process control value, diagnostic information or early alert.

Figure 9:
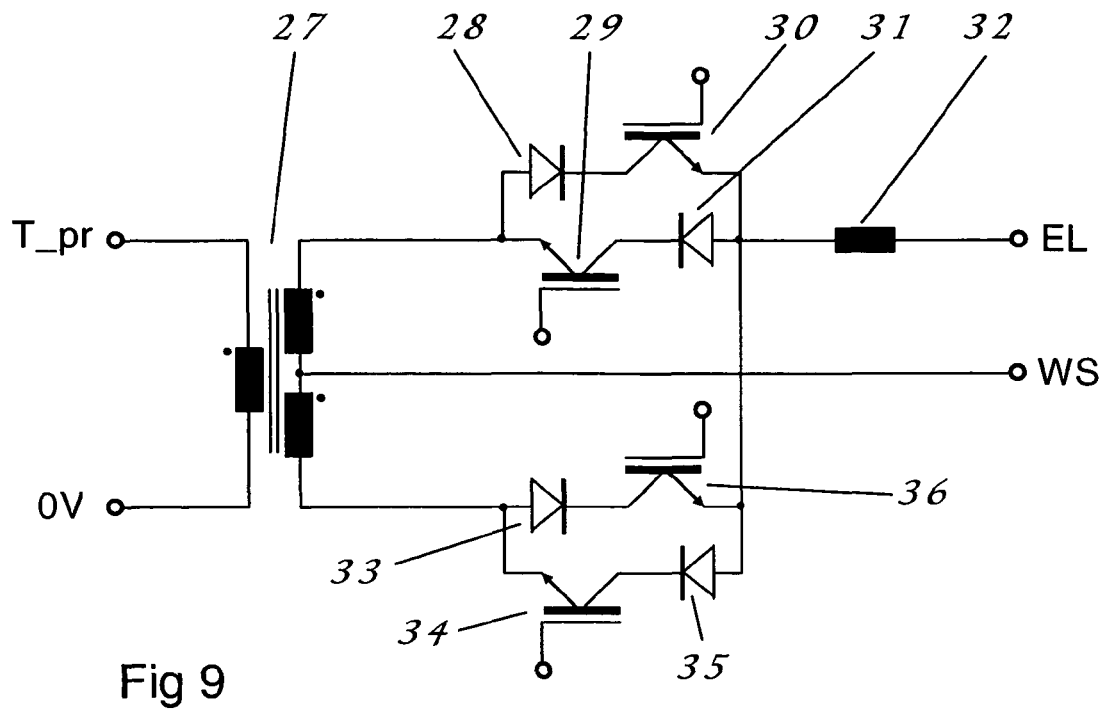
FIG. 9 is a circuit diagram of an inverter circuit including an isolating transformer of an embodiment of the invention.

The primary input T_pr of an isolating transformer 27 of the inverter circuit 28-32 as shown in FIG. 9 is connected to the corresponding output T_pr of the charge/discharge circuit 18-26 as shown in FIG. 8. The second primary input 0V of the isolating transformer 27 is connected to the corresponding neutral 0V as shown in FIG. 7. The isolating transformer 27 comprises two secondary windings connected in series so as to always make the positive and negative pulse polarity available. The neutral of these secondary windings is connected to the output WS which in turn is connected to the work piece. Configuring the generator circuit strictly symmetrical about the neutral 0V is of advantage for electromagnetic compatibility. Since the work piece is normally at ground potential no, or only insignificant, capacitive displacement currents materialize through the circuit to the AC mains connection 1. The advantage is a reduction in costs, losses and footprint for large magnetic suppression elements. The two other terminals of these secondary windings of the isolating transformer 27 are connected to the output EL via switching elements 29, 30, 34 and 36 as well as their assigned diodes 28, 31, 33 and 35 and via an inductance 32. The output EL is in turn connected to the electrode. The switching elements 30 and 36 in this arrangement are turned on for positive discharge pulses whilst the switching elements 34 and 29 are used correspondingly for the negative discharge pulses. This enables any momentary polarity of the charging voltage of the pulse capacitor 22 to be converted into an arbitrary polarity for the discharge pulse into the spark gap.

The inverter circuit can, however, also be simplified when, e.g. for a die sinking machine, only positive discharge pulses are needed from the generator module by eliminating the switching elements 29, 34 and their diodes 31, 35. The same applies for a wire cutting machine from which the switching elements 30, 36 and their diodes 28, 33 can be eliminated when requiring only negative pulses. The same holds for all further circuits to be described in connection with FIGS. 13-18.

The isolating transformer 27 offers likewise multiple dimensioning degrees of freedom. Advantageously, one ensures an adequate surge voltage withstanding capacity for isolating the AC mains in keeping with standard requirements. Furthermore, one idealizes the coupling between the primary side and secondary side and maintains the main inductance sufficiently high so that no excessively high magnetization currents occur. Both measures advantageously prevent losses of the pulse current.

For an optimum coupling a winding ratio of 1:1 is ideal, although deviating from this requirement may be of advantage for the overall efficiency to operate e.g. the charge/discharge circuit 18-26 as shown in FIG. 8 with less current and correspondingly more voltage as may be quite right since corresponding components having a high surge voltage withstanding capacity are available and, as explained below, no commutation losses have to be dealt with. Reducing the current diminishes the forward losses of all switching elements and diodes in thus enhancing the overall efficiency.

The cited requirements on the isolating transformer 27 are preferably satisfied with planar transformers having planar cores and planar windings. Such transformers with special regard to standard isolation performance are disclosed in U.S. Pat. No. 5,010,314 and made by the firm of PAYTON PLANAR MAGNETICS Ltd. Boca Raton South Fla. USA. Since the voltage/time area of the pulses being transmitted is very small, these transformers are so small and light that they can be integrated in the printed circuit of a generator module with no problem. This technology is also advantageous for the inductances 14, 15 and 32.

The inductance 32 can be chosen smaller, or even eliminated altogether as long as the conductor to the electrode and the stray inductance of the isolating transformer 27 already comprises adequate inductance. The inductance is necessary for channel separation when multiple generator channels overlap in pulsing an electrode.

In FIGS. 7, 8 and 9 MOSFETs and IGBTs are cited as the switching elements 10 to 36. This is not a mandatory choice and can be altered by the person skilled in the art in accordance with the specific requirements. For the arrangement of the switching elements 29, 30, 34, 36 and diodes 28, 31, 33, 35 of the inverter 28-32 as shown in FIG. 9 there are likewise alternatives. Thus, for instance, switching element 29 with switching element 30 in the opposite direction can be connected in series, with the diodes 28 and 31 parallel thereto in the corresponding opposite direction. Here too, the person skilled in the art will choose the variant as most favourable overall for the requirement in each case.

The switching elements 18, 19, 24, 26, 29, 30, 34, 36 are subject only to forward losses, i.e. they are each activated with zero current because each sinusoidal half-wave commences with zero current and thus the product of voltage and current (in other words the power loss during commutation) is likewise zero. For turning off, the situation is even more favourable, since for this point in time both the current and the voltage amount to zero, because the voltage is blocked by a corresponding series diode 23, 25, 28, 31, 33, 35.

The signals needed to control all switching elements 10, 11, 16, 17, 18, 19, 24, 26, 29, 30, 34, 36 are furnished by a controller (FPGA in FIG. 10) via DC decoupled driver circuits (not shown).

Figure 10:
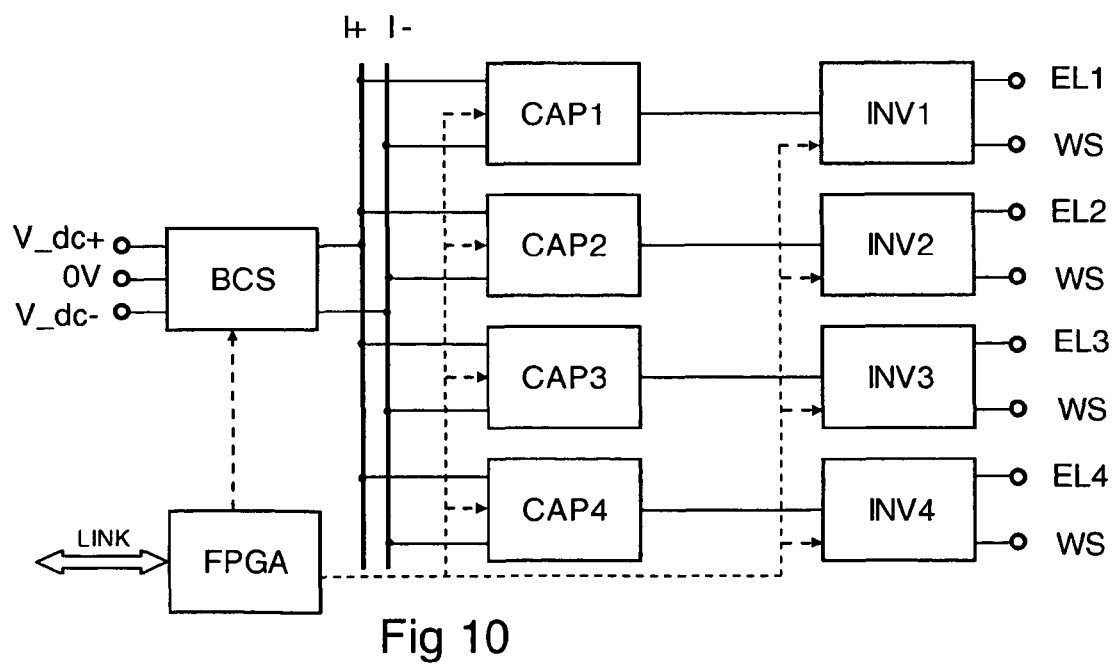
FIG. 10 is a circuit diagram of a generator module including a plurality of charge/discharge circuits and a plurality of inverter circuits of an embodiment of the invention.

As evident from FIG. 6 a bipolar current source 6-17 needing simply to charge a single pulse capacitor 22 would be undertaxed because of the short charging time t_chrg. Therefore, FIG. 10 illustrates a generator module in a multi-channel configuration, all channels of which are discharged into the same spark gap (as an alternative some or all of the channels could also be discharged into a plurality of different spark gaps). This generator module consists of just one bipolar current source BCS (such as shown in FIG. 7) with the inputs V_dc+, 0V and V_dc− as well as one controller FPGA connected by a data link (LINK) to the node (node 5 as shown in FIG. 1). The controller (FPGA) is preferably a field-programmable gate array, i.e. a digital configurable logic circuit which can also be configured by the data link (LINK) and supplied with variable settings, it even being possible to load a new configuration during system operation. This is why these circuits achieve maximum functional flexibility and thanks to parallel data processing are significantly faster than even the fastest available microprocessors. However, should sequential data processing be needed, there is no problem in implementing this too in the FPGA, i.e. without negative influencing the speed of parallel processing.

Connected to the bipolar current source BCS are multiple charge/discharge circuits CAP1 to CAP4 (such as shown in FIGS. 8, 13, 15 and 17) for pulse capacitors 22 via the conductors I+ and I−. Each charge/discharge circuit CAP1 to CAP4 is connected to an inverter circuit INV1 to INV4 (such as shown in FIGS. 9, 14, 16 and 18). The inverter circuits INV1 to INV4 have separate outputs to the work piece WS as well as separate outputs EL1 to EL4 connected in common to an electrode (as an alternative multiple outputs may also be connected singly or combined to a plurality of single electrodes).

The controller FPGA comprises links shown as dotted lines to all switching elements and sensors of the various circuit groups CAP1-CAP4 and INV1-INV4. These symbolize driver circuits for driving the switching elements but which also monitor the switching elements and make connections to the sensors (such as SENS of FIG. 8, +SENS and −SENS of FIGS. 13, 15 and 18, DSC SENS of FIGS. 14, 16 and 18). Due to the central function of the controller FPGA an ideal coordination and monitoring of the complete generator module is possible with no time delay nuisance. All conditions, malfunctions and sensed values are signalled via the data link LINK to the node 5 in FIG. 1 as they occur, cyclically or on request. Such a module can now be produced automatically with the unwired SMD components as discussed below and with the SMT production methods.

Since these modules are intended to be installed everywhere in the machine they must not emit heat to their surroundings.

Since normal air cooling could be insufficient for this purpose, a fluid cooling system is preferred to carry off the dissipated heat. The modules can also be protected from harsh environmental effects in the machine such as dirt, splash water and electromagnetic interference by a dense housing of metallized plastics or, even better, of metal to meet these requirements.

The controller FPGA stores data sets for controlling the discharge circuits CAP1-CAP4 and the inverter circuits INV1-INV4. These data sets corresponding to each of the predefined waveforms of the various discharge pulses are either stored precalculated in the numerical control (CNC in FIG. 1) or are computed therein by way of mathematical and trigonometric operations and communicated to the controller FPGA. As an alternative, precomputed data sets can, of course, also be stored in the controller FPGA for selection there.

In this arrangement a waveform (herein also referred to as pulse shape) once defined in a data set can be proportionally increased or decreased in amplitude. For this purpose the data set receives only an additional proportionality factor which is used in the numerical control CNC or controller FPGA to proportionally increase or decrease, for example, all charging voltage set values. Modifying the pulse amplitude in this way can be done with any resolution as required.

This thus makes it possible, starting with a rough machining pulse, by continually reducing the proportionality factor, to make a smooth change to a finer, but in the amplitude proportional machining pulse. Application of this method results in a more consistent work piece quality with minimum machining time.

The user has the choice of either directly selecting a specific pulse shape in accordance with his particular machining requirement, or the numerical control CNC or controller FPGA decides by itself as required, which pulse shape is best suited for the momentary machining requirement. This selection can be made, for example, as a function of the wanted machining accuracy, the specified electrode wear, the prescribed machine rate and the like. Depending on the particular machine requirement the average person skilled in the art is aware of a variety a pulse shapes in addition to the ones described herein in detail. In the following some known and novel pulse shapes and their synthesis are described starting from the partial pulses of the pulse capacitors 22.

In addition, the following discussion is understood to be based on partial pulses in the form of a sinusoidal half-wave as materializing approximately in discharge of a capacitor (in this case pulse capacitor 22) via an inductance (in this case particularly isolating transformer 27, inductance 32 and the conductor connecting the electrode). When other elements are inserted in the discharge circuit connecting the electrode, the partial pulses may deviate from a sinusoidal half-wave shape.

The voltage curve at the pulse capacitor 22 contains a variety of useful direct and indirect information as to charge condition, discharge pulses and condition of the spark gap.

Figure 11:
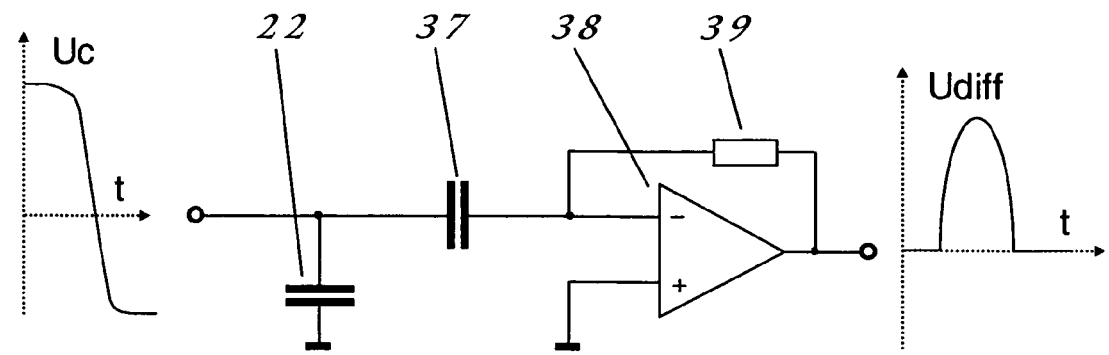
FIG. 11 is a circuit diagram of a sensor indirectly sensing the discharge current.

FIG. 11 illustrates a first embodiment for the sensor (such as SENS of FIG. 8, +SENS and −SENS of FIGS. 13, 15 and 18, DSC SENS of FIGS. 13, 14, 16 and 18) for indirectly obtaining the discharge current. A known differentiating circuit comprising the differentiating capacitor 37, operational amplifier 38 and feedback resistor 39 can proportionally simulate the discharge current shape at their output in the form of the variation in time of a voltage signal Udiff.

The discharge current curve I as a function of time is given by the equation:

$$I = C * dU/dt \quad (2)$$

where C is the capacitance of the pulse capacitor 22, and dU/dt corresponds to the charging voltage Uc at the pulse capacitor 22 derived as a function of time. The sensor then recognizes the current in accordance with the equation of the differential amplifier:

$$Udiff = -R39 * C37 * dU/dt \quad (3)$$

where R39 is the feedback resistor 39, C37 is the differential capacitor 37 and dU/dt corresponding in turn to the charging voltage Uc at the pulse capacitor 22 derived as a function of the time. Since both C as well as R39 and C37 are constants the output Udiff is a true proportional image of the discharge current I.

Subsequent circuits (not shown), e.g. sample & hold amplifiers, integrators, comparators and analog/digital converters as known to the person skilled in the art can extract from the signal Udiff a variety of useful information such as pulse duration, peak current, RMS value of the current, etc., all of which is forwarded in digital form to the controller FPGA. Obtaining information in this way is directer, quicker, more compact, more cost-effective and with less loss than known solutions involving measuring resistors and current sensors, it being particularly straight forward to integrate this in the overall concept of the generator module. The applicant reserves to claim protection for the construction of the sensor as described above or below independent of other features disclosed herein.

Figure 12:
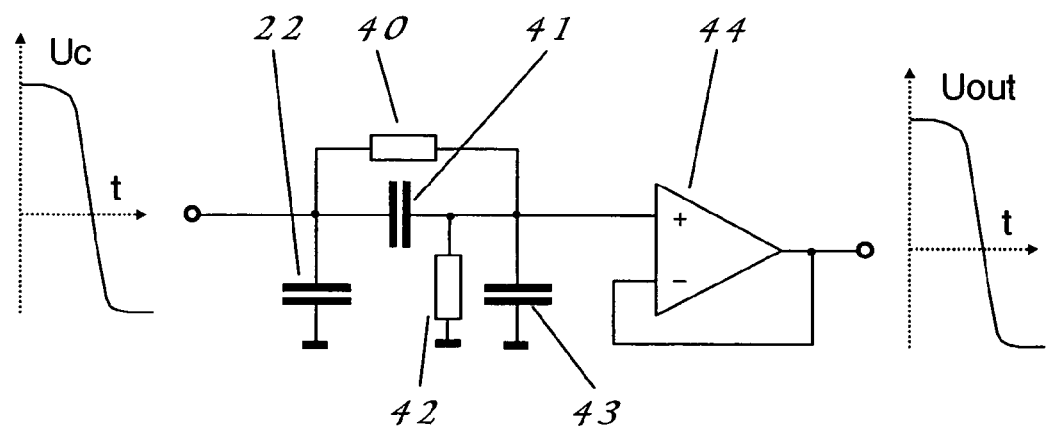
FIG. 12 is a circuit diagram of a sensor for sensing the charge voltage.

FIG. 12 illustrates an embodiment of the sensor SENS for measuring Uout of the charging voltage Uc of the pulse capacitor 22. A voltage divider comprising the resistors 40 and 42 divides the charging voltage Uc to a such value which is then reproduced as a low impedance signal Uout by an operational amplifier 44 in the voltage follower configuration.

So as not to unnecessarily discharge the pulse capacitor 22 the value of the resistors 40 is typically selected in the single-digit MΩ range. An undistorted reproduction of the high-frequency components of the charging voltage Uc is ensured by a capacitive voltage divider in parallel thereto, comprising the matched capacitors 41 and 43. Further processing is analogous to that as for the current sensor described above.

In addition to the control signals for the bipolar current source 8-17 a spark burning voltage (as described in the Proceedings of the 13$^{th}$ ISEM Vol. 1, Bilbao 2001, pages 3 to 19) averaged over the pulse duration can also be obtained, for example, from the charging voltage Uc of the pulse capacitor 22. Because of the inductive drop in voltage across the wire this quantity can hardly be measured with current measurement methods on a wire cutting machine.

It is sufficient with a sample & hold amplifier to memorize the charging voltage U_chrg (FIGS. 5, 6) prior to discharge, to form the difference with the residual charging voltage U_end after discharge and to multiply the result after an amplification of 0.5. From the averaged spark burning voltage such useful information as to short-circuits, discharge with twice the burning voltage (meaning poor current contact on the wire electrode), resistive discharges (meaning poor flushing) etc. as to how the process in progressing in real time can be obtained which can then be used in turn in open and closed loop control and optimizing.

Figure 13:
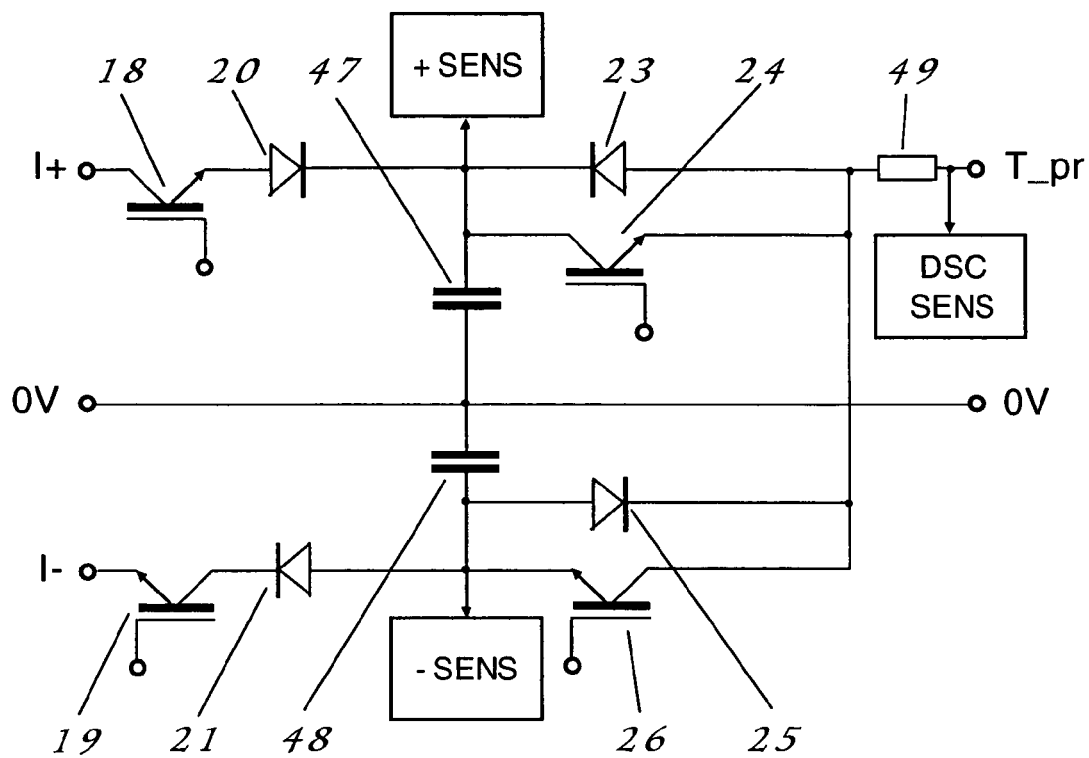
FIG. 13 is a circuit diagram of a charge/discharge circuit for generating an ignition voltage according to a first embodiment.

FIG. 13 illustrates a first embodiment of a charge/discharge circuit 18-26 for generating ignition voltage which is similar in construction to the charge/discharge circuit 18-26 for generating the discharge pulse as shown in FIG. 8. Since in generating an ignition voltage the pulse capacitor 22 is not, or only insignificantly, discharged, it is divided into a positively charged pulse capacitor 47 and a negatively charged pulse capacitor 48. The voltage of positive and negative polarity furnished by the two pulse capacitors 47 and 48 is then switched alternately to the primary winding of the isolating transformer 27 needing to be supplied with an AC voltage.

As an alternative only one pulse capacitor 22 could be used and the necessary AC voltage generated via additional switching elements or via a second primary winding of the isolating transformer.

Analogous to the positive polarity circuit branch as shown in FIG. 8, in the negative polarity circuit branch the switching element 19 and diode 21 are connected correspondingly to the negative pulse capacitor 48, the same applying to the switching element 26 and the diode 25.

The sensor +SENS and −SENS is likewise provided for both pulse capacitors 47, 48, the diodes 23 and 25 being connected in parallel to the switching elements 24, 25. This is advantageous in that any overvoltage due to oscillations coming from the spark gap can be recuperated in the pulse capacitors 47, 48.

Figure 14:
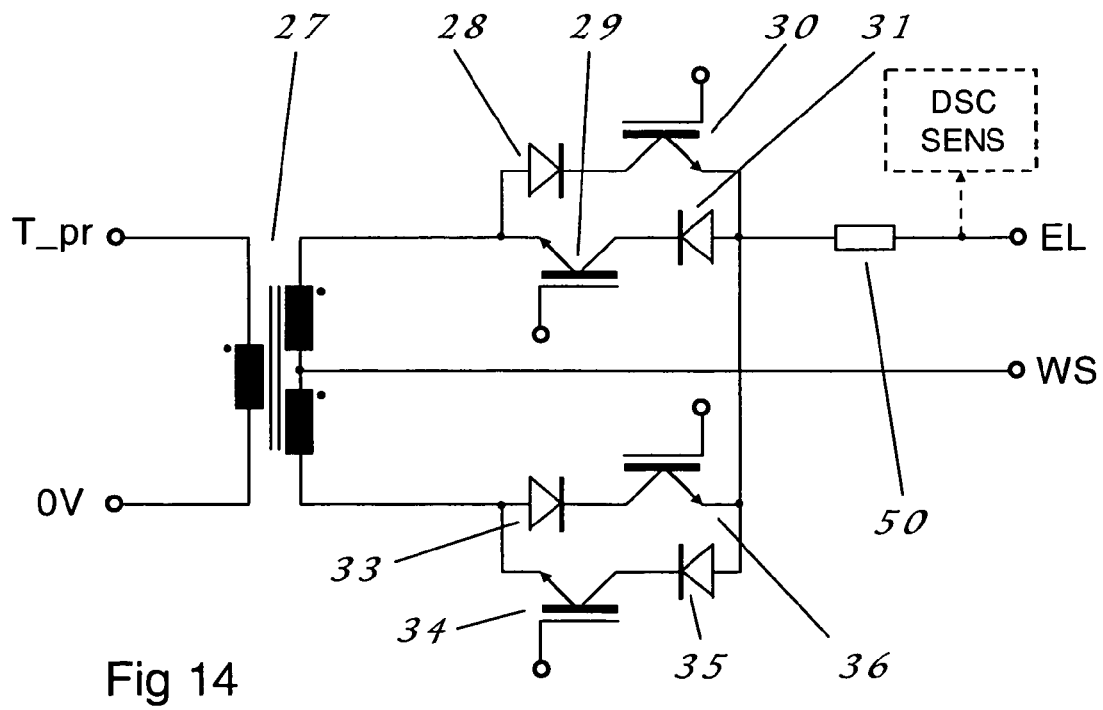
FIG. 14 is a circuit diagram of an inverter circuit for generating an ignition voltage according to a first embodiment.

Energy recovery is controllable depending on whether for a pulse only one current direction of the inverter circuit (e.g. only switching element 30 with diode 28 as shown in FIG. 14, no recuperation) or both current directions (e.g. switching element 30 with diode 28, and switching element 29 with diode 31 as shown in FIG. 14, with recuperation desired) is/are enabled.

Figure 16:
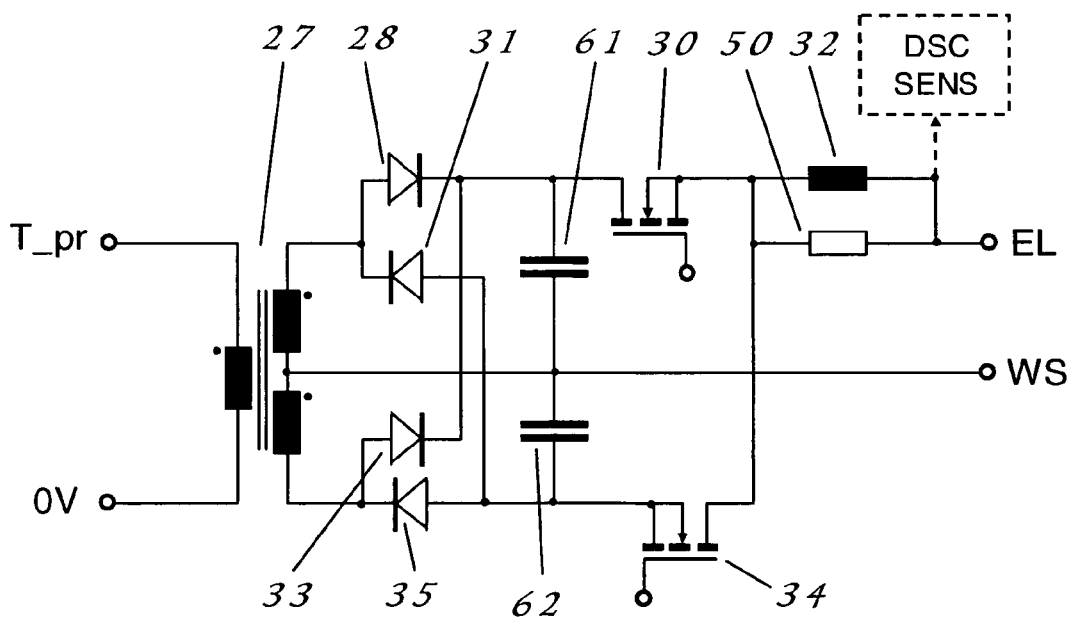
FIG. 16 is a circuit diagram of an inverter circuit for generating an ignition voltage and small discharge currents according to a second embodiment.

The circuit as shown in FIG. 13 further comprises a matching resistor 49 to passively adapt the output impedance of the terminal T_pr to the high-frequency response of the isolating transformer 27 by known ways and means. This matching resistor 49 can be made further use of to detect the condition of the spark gap. More particularly, with an additional discharge sensor DSC SENS (such as shown in FIG. 12) the start of a discharge can be sensed with zero delay and at low cost. As an alternative this discharge sensor DSC SENS can be applied directly to the output of the ignition voltage source as indicated in FIG. 14 and FIG. 16. The advantage therein is sensing irrespective of the condition of the various switching elements, the disadvantage is being confronted with higher noise.

FIG. 14 illustrates an inverter circuit 28-36 corresponding to that as shown in FIG. 9 except that the inductance 32 is replaced by a further matching resistor 50. This matching resistor 50 too, mainly serves to passively adapt the output impedance of the inverter circuit 28-36 to the high-frequency response of the spark gap. However, the matching resistor 50 may also serve to discharge the spark gap during the pulse pauses by the switching elements 29, 30, 34 and 36 being turned on during the pulse pauses.

It is likewise possible to switch a countervoltage to the spark gap during pulse pauses with the object of minimizing the average voltage of the EDM voltage. This method is of advantage when using aqueous dielectrica.

Assuming now that for a generator module as shown in FIG. 10 the first channel CAP1, INV1 is configured as the ignition voltage generator channel in accordance with FIGS. 13 and 14, the remaining channels CAP2-4, INV 2-4 are configured as discharge current channels in accordance with FIGS. 8 and 9.

When starting machining all pulse capacitors 22 are firstly charged via the bipolar current source 8-17 (FIG. 7) to a charging voltage sufficient to attain a desired current amplitude. The positive pulse capacitor 47 and negative pulse capacitor 48 are charged to the same positive and negative charging voltages to generate a desired ignition voltage as a function of not only the cited charging voltages but also, among other things, of the winding number ratio of the isolating transformer 27.

During the pulse duration, and only as long as no discharge occurs at the spark gap, the switching elements 24, 25 of the ignition voltage generator channel CAP1, INV1 are turned on alternately. The duty cycle is preferably approximately 50% so as not to load the isolating transformer 27 with a DC voltage component where possible. The switching frequency is preferably adapted to the isolating transformer 27 so as not to exceed the permissible voltage-time integral and to keep the magnetization current small so that no significant reduction in the ignition voltage occurs. This is why the isolating transformer 27 of the ignition voltage generator channel CAP1, INV1 is configured to advantage with a high main inductance, i.e. with a high winding number of the isolating transformer 27.

During the pulse duration, and as long as no discharge occurs, the switching elements of the desired polarity, e.g. 30 and 36 of the inverter circuit 28-35 are activated according to a first embodiment. In another embodiment, an AC voltage of optional frequency can be generated by correspondingly turning on the switching elements 30 and 36 as well as 29 and 34 during an EDM pulse or from one such pulse to the next. For instance, during one EDM pulse the polarity of said ignition voltage might be inverted once or several times prior to ignition. Furthermore, during the pulse pauses between said EDM pulses a voltage having a polarity opposite to said polarity of said ignition voltage might be applied to said spark gap.

When the discharge sensor DSC SENS senses a discharge, the ignition voltage generator channel CAP1, INV1 is turned off and the remaining discharge current generator channels CAP2-4, INV2-4 generate the desired discharge pulse. Since the current amplitude is a direct function of the charging voltage of the pulse capacitor 22, small pulse currents can also be generated by the ignition voltage generator channel CAP1, INV1 of the order of 2 A and less.

The ignition voltage can be set very fine via the bipolar current source 8-17 (FIG. 7) and the charging voltage and it can even be changed during a pulse. The charging voltage measured at the sensors +SENS, −SENS is continually compared to a set value and, where necessary, corrected via the bipolar current source 8-17. In particular, the charging is discontinued when said measured voltage exceeds a maximum set value and charging is reassumed when said measured charging voltage drops below a minimum set value. The efficiency remains unchanged high due to the fact that the ignition voltage generator channel CAP1, INV1 only needs to furnish a voltage, but no current.

Figure 15:
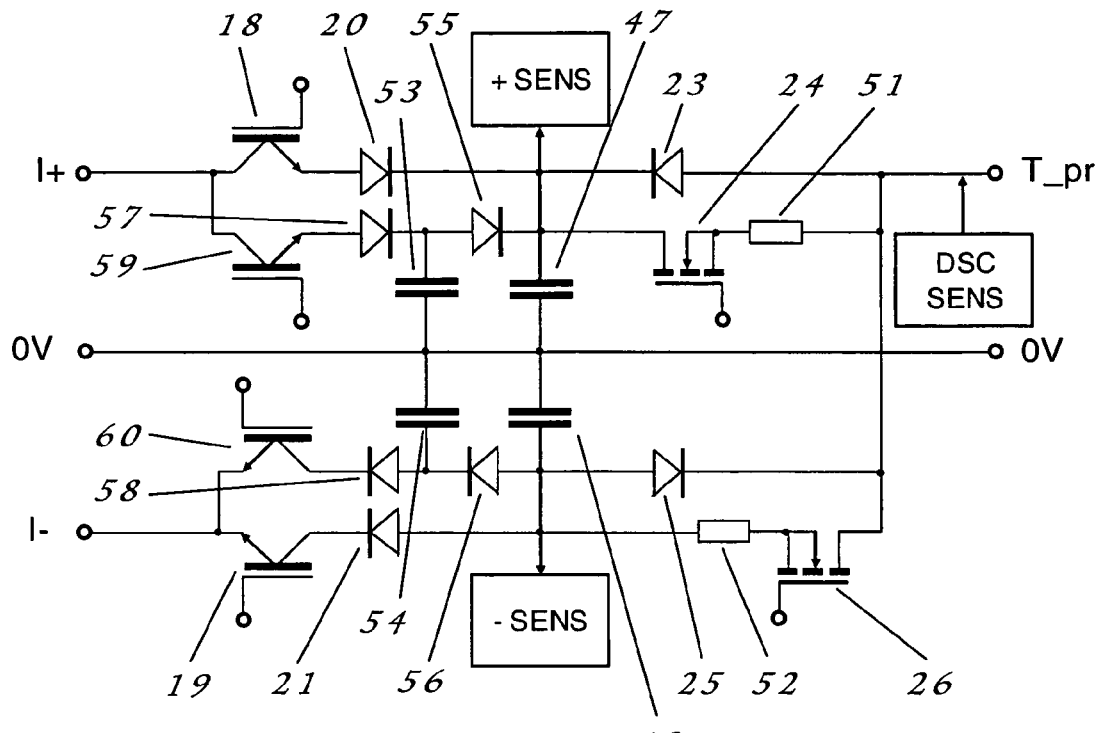
FIG. 15 is a circuit diagram of a charge/discharge circuit for generating an ignition voltage and small discharge currents according to a second embodiment.

FIG. 15 illustrates a further embodiment of the charge/discharge circuit for an ignition voltage generator channel which can also furnish smaller pulse currents with good efficiency. Unlike the charge/discharge circuit as shown in FIG. 13, the number of pulse capacitors is again doubled. The positive and negative pulse capacitors 47, 48 are maintained relatively small (in the range from 100 pF to 100 nF) and serve to set the ignition voltage. Via diodes 55, 56 larger pulse capacitors 53, 54 (in the range from 1 µF to 1000 µF) are connected in parallel thereto. These serve to set the discharge current and can be charged via additional switching elements 59, 60 and diodes 57, 58 irrespective of the ignition voltage. In this embodiment the switching elements 24, 26 form together with the current measuring resistors 51, 52 linear current sources 24, 51 and 26, 52. These linear current sources 24, 51 and 26, 52 have the primary task of maintaining the discharge current at the desired set value during the short transition time in which after commencement of discharge the pulse current discharges the low capacity pulse capacitors 47, 48.

The linear current sources 24, 51 and 26, 52 may, however, also serve modulating the discharge current in thus generating, for instance, ramped EDM pulses, or EDM pulses having a ripple of optional frequency, or peaked pulses. For this cases it is sufficient to supply the linear current sources 24, 51 and 26, 52 with correspondingly shaped set value signals (from the FPGA, for example).

In addition, the linear current sources 24, 51 and 26, 52 can be used for shaping the voltage of the ignition pulse by, e.g. permitting a higher current at the start of the EDM pulse to achieve a steeper rise in voltage. After a defined time the current can then be reduced to achieve asymptotic settling to the desired open circuit voltage. Indeed, for an ideal efficiency the small capacitors 47, 48 can be selected so that their charge suffices to permit the ignition voltage of the spark gap to settle at just the set value when linear current sources 24, 51 and 26, 52 are saturated.

When, as shown in FIG. 15, the charging voltage of the pulse capacitors 47 and 48 becomes smaller than the charging voltage of the large pulse capacitors 53, 54, the diodes 55 and 56 respectively becomes conducting and the current is then furnished from these pulse capacitors 53, 54. The pulse capacitors 53, 54 are charged only as high (e.g. in the 30V to 50V, preferably to 30V) that the current sources 24, 51 and 26, 52 just become saturated in normal operation, i.e. that only a very small drop in voltage of a few volts (preferably less than 50%, more preferably less than 20% relative to the charging voltage) occurs across these voltage sources 24, 51 and 26, 52. Furthermore, during the EDM pulse the charging voltage of the large pulse capacitors 53, 54 after ignition is controlled such that the difference of the voltage applied to said spark gap less said charging voltage equals a specific set value preferable in the range 5V to 25V. For a charging voltage of 30V and a drop in voltage of 5V with 3 A pulse current the power loss is 15 W, whilst at the spark gap the power available is 25V times 3 A, in other words 75 W corresponding to an efficiency (for each duty cycle) of better than 83% for the linear current sources 24, 51 and 26, 52. By contrast, the efficiency of DC regulator-type sources is less than 10% particularly with short pulses having smallish pulse currents and long pauses. The reason for this is the high structural requirement for auxiliary feed voltages and regulator circuits, as well as because of the commutation and power losses (a diode alone handling a standby current of 3 A will already result in losses of around 5 W).

FIG. 16 illustrates an inverter circuit adapted to the charge/discharge circuit of FIG. 15. In this case the diodes 28, 31, 33, 35 form a bridge circuit which charges filter capacitors 61, 62 positively and negatively, respectively. These filter capacitors 61, 62 are selected with small capacitance and have simply the task of closing fleeting gaps in voltage and current having resulted from the AC voltage from the isolating transformer 27 due to rectification. By selecting the stray capacitance and stray inductance high enough in the discharge circuit the filter capacitors 61, 62 can be eliminated.

Provided at the output are the switching elements 30, 34 which are capable of switching between the two polarities very quickly, permitting e.g. the generation of AC ignition pulses of optional frequency or a positive ignition voltage alternating with a negative discharge current. In general, the polarity of said discharge current might be selected as a function of the polarity of said ignition voltage.

The switching elements 30, 34 are in turn followed by a matching impedance 32, 50 for high frequency adaptation of the ignition voltage generator to the spark gap. Preferably, a small DC resistance is set and a small inductance 32 is connected in parallel with the matching resistor 50 to maximize the overall efficiency of the ignition voltage generator.

Figure 17:
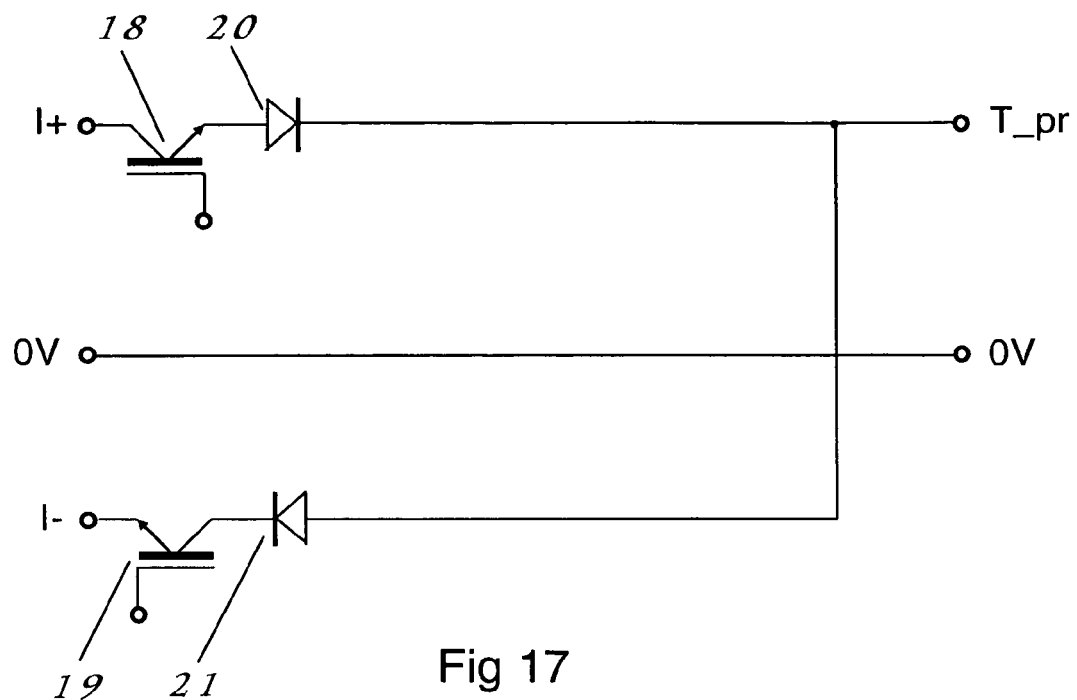
FIG. 17 is a circuit diagram of a charge/discharge means for generating an ignition voltage and small discharge currents according to a third embodiment.
Figure 18:
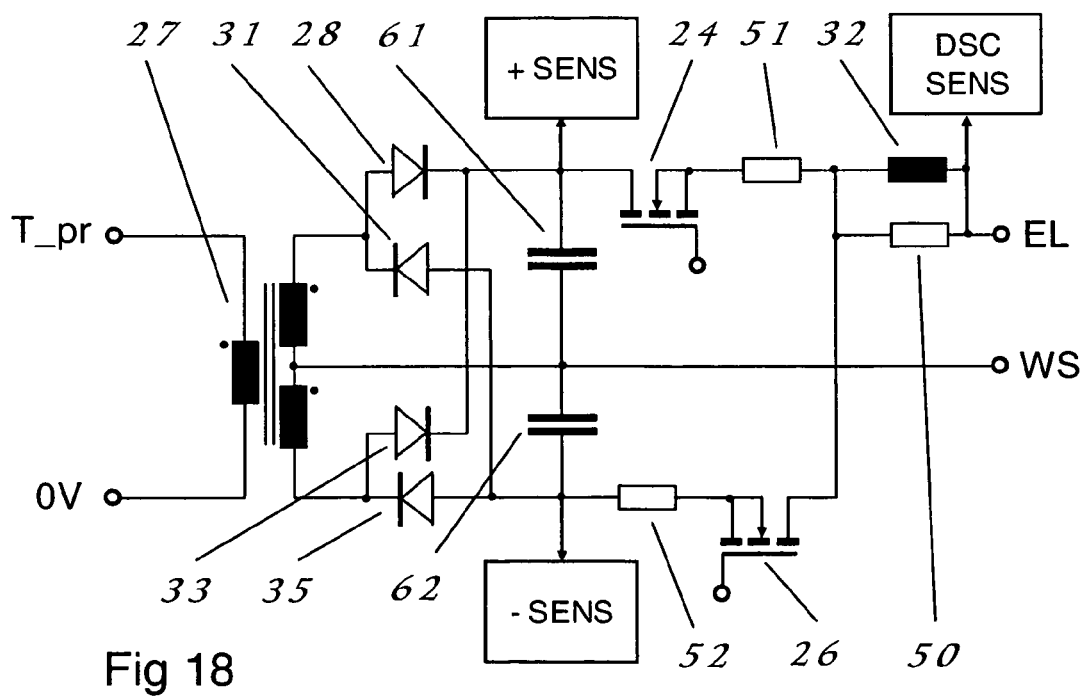
FIG. 18 is a circuit diagram of an inverter circuit for generating an ignition voltage and small discharge currents according to a third embodiment.

FIGS. 17 and 18 illustrate another embodiment of an ignition voltage generator which in addition to the ignition voltage also furnishes smallish discharge currents. The basic principle as shown in FIGS. 15 and 16 is here the same, except that instead of the pulse capacitors 47, 48, 53, 54 merely the filter capacitors 61, 62 at the secondary side are used for voltage and pulse current generation and, thus, serve as the pulse capacitors (47 and 48 in FIGS. 13 and 15). These filter capacitors 61, 62 need to be dimensioned somewhat larger than those as shown in FIG. 16 for a better performance in the dynamic control of the charging voltage by a compromise between maximized efficiency and a modest switching frequency.

In this case, namely, the filter capacitors 61, 62 are charged directly by the bipolar current source 8-17 (FIG. 7) and via the switching elements 18, 19, the isolating transformer 27 and the diode bridge 28, 31, 33, 35. The switching elements 18, 19 in this arrangement are turned on alternately so that the isolating transformer 27 is loaded only by an AC voltage. The diode bridge 28, 31, 33, 35 uniformly apportions each charge pulse on the positive filter capacitor 61 and negative filter capacitor 62. Automatic apportioning can be inhibited by adding to each diode of the diode bridge 28, 31, 33, 35 a switching element in thus enabling the filter capacitors 61, 62 to be charged to differing voltages as may be necessary for special applications.

The charging voltage sensors (+SENS, −SENS) in this case are included in the inverter circuit, the same applying to the linear current sources 24, 51 and 26, 52 replacing the switching elements 30, 34 in additionally handling the task of applying the EDM pulses to the spark gap with correct polarity. In this case the linear current sources 24, 51 and 26, 52 can additionally handle other tasks such as shaping the ignition voltage and discharge current, but also activate adaptation to the high frequency response of the spark gap (linear current sources can be modulated very quickly in their resistance). Otherwise, the function of the circuit is basically the same as described and as shown in FIGS. 15 and 16.

Although this embodiment is lower in cost, because of the compromise of using only one capacitance each for voltage and current regulation its efficiency is less than in the preceding embodiments. In addition, the noise on the sensors (+SENS, −SENS, DSC SENS) is higher.

Figure 19A:
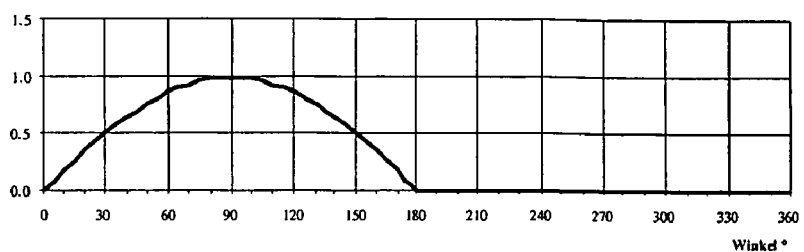
FIGS. 19a-d show the composition of a sinusoidal pulse on the basis of three partial pulses.
Figure 19B:
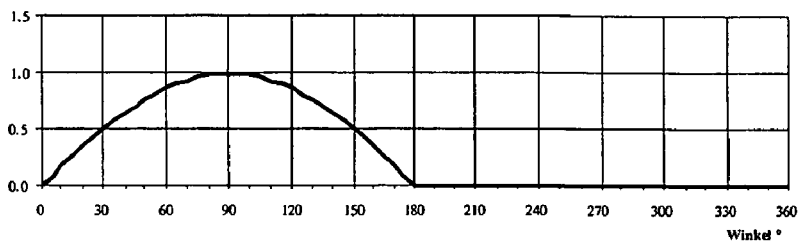
Figure 19C:
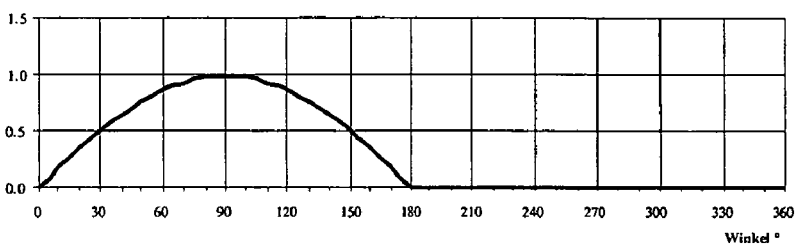
Figure 19D:
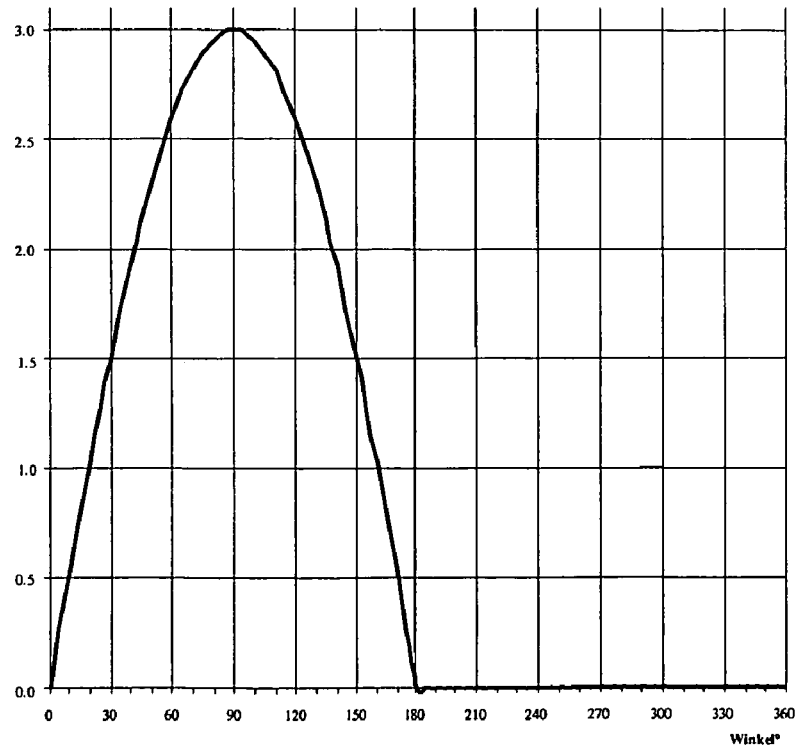

FIGS. 19a to 19c illustrate three sinusoidal partial pulses from three pulse capacitors 22 with a duration of 180° and an amplitude equal to 1 which are discharged in synchronism into the spark gap. The resulting pulse in FIG. 19d has likewise a duration of 180° but an amplitude of 3.

The corresponding electrical values in the current and time range could, for instance, amount to 300 A and 1.8 μs for the resulting discharge pulse. The proportionality is calculated from the elements determining the time and amplitude, namely capacitance, inductance and charging voltage.

Activating further channels in synchronism would correspondingly increase the amplitude whilst the time remains roughly the same. More precisely, the time would slightly increase as caused by the inductance component in the working space (e.g. inductance of the wire electrode) common to all channels. The amplitude of every partial pulse can be set for each channel via the charging voltage with high resolution and without influencing the pulse duration.

The pulse duration of each partial pulse is preferably set by the value for the capacity of the pulse capacitor 22. Halving the pulse time would, as known, be achieved with a four-times smaller value for the capacitance of the pulse capacitor 22. Maintaining the amplitude would require doubling the charging voltage.

Also having a direct influence on the pulse duration is the resulting inductance of the discharge circuit which here is constituted of the stray inductance of the isolating transformer 27, the inductance 32 and the inductance of the working space. These components are somewhat less suitably to be configured variable and are preferably maintained as small as possible.

Figure 20A:
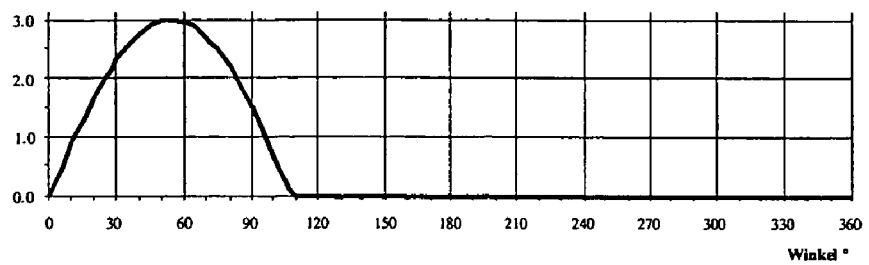
FIGS. 20a-c show the composition of a pulse having steep flanks on the basis of two partial pulses.
Figure 20B:
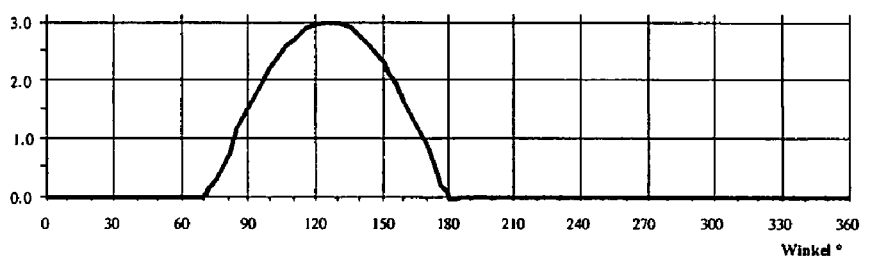
Figure 20C:
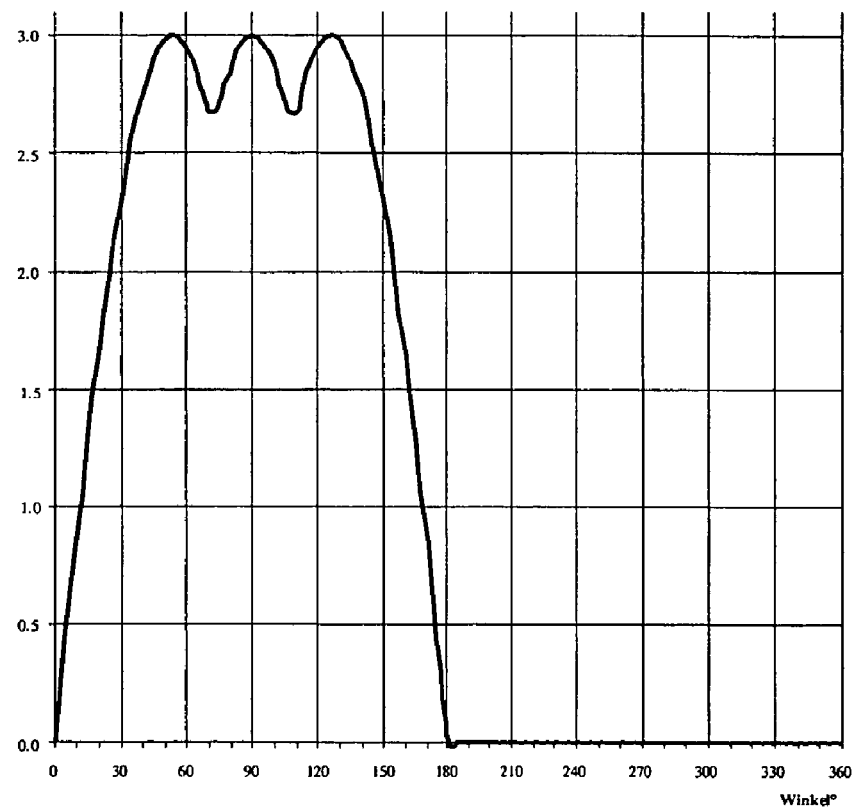

FIGS. 20a, b illustrate two pulses both of a shorter duration of 108°, phase shifted by 120° but featuring an amplitude of 3. The sum of the pulses as shown in FIG. 20c has a pulse duration of 180° and an amplitude of 3, but integration indicates that the area content is 20% higher. Also the pulse rise from 0° to 30° is 53% steeper than with the waveform as shown in FIG. 19. This waveform simulates discharge of a delay line in which an infinite number of line elements of infinitely small capacitance and infinitely small inductance are discharged one after the other, resulting in an absolutely perfect square wave pulse. Here, this infinitesimal approach is of less interest than the principle of a constant time shift between individual pulses. Any number of more than three single pulses produces but marginal improvements in the area content and edge steepness of the pulse in all but increases the operating frequency of the generator.

Figure 21A:
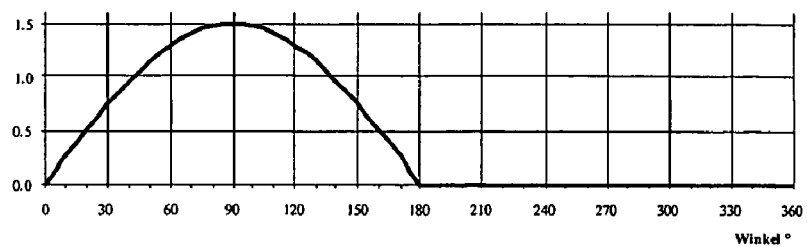
FIGS. 21a-d show the composition of a pulse having steep flanks and a high amplitude on the basis of four partial pulses.
Figure 21B:
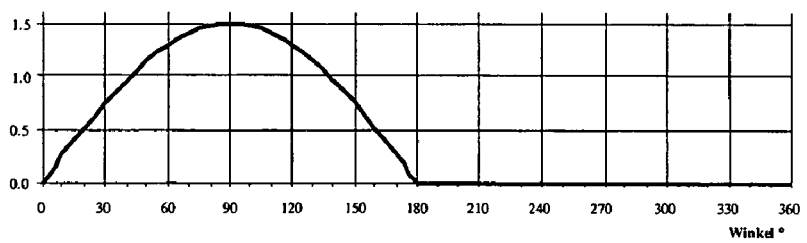
Figure 21C:
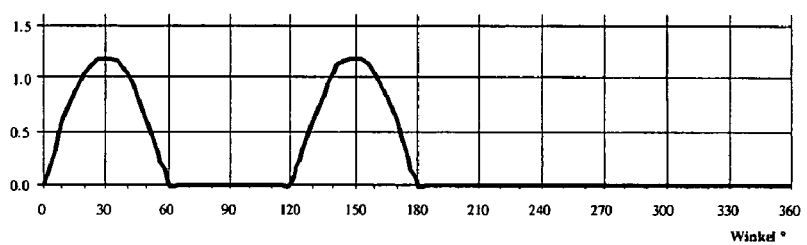
Figure 21D:
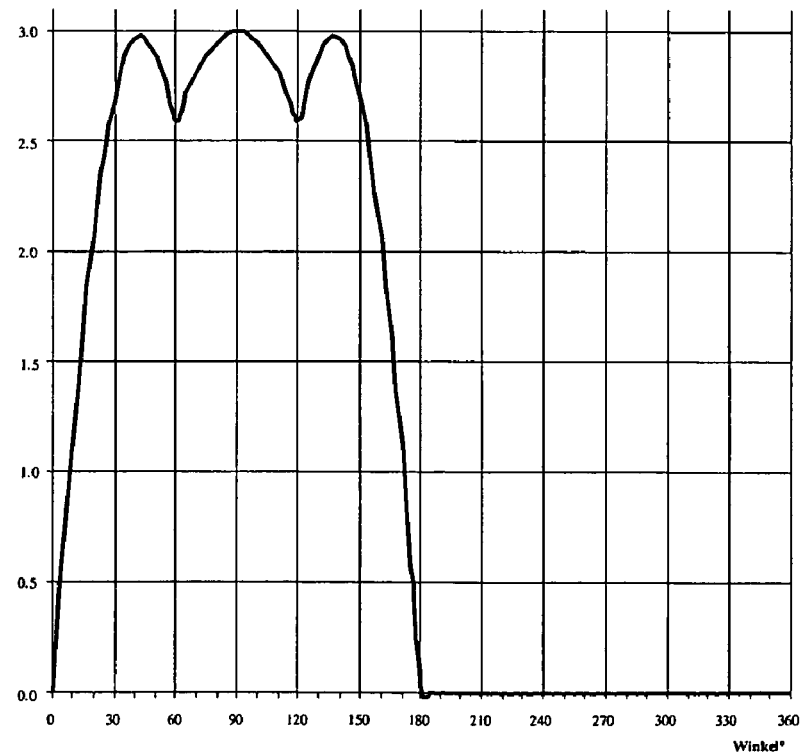
Figure 22A:
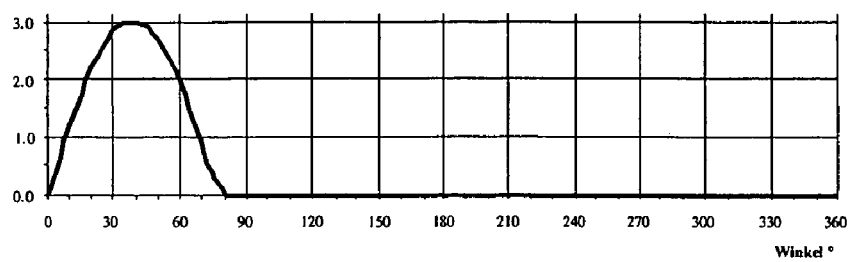
FIGS. 22a-d show the composition of a quasi-rectangular pulse on the basis of three partial pulses.
Figure 22B:
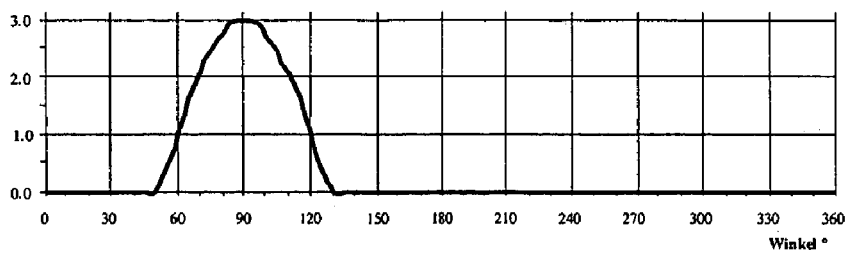
Figure 22C:
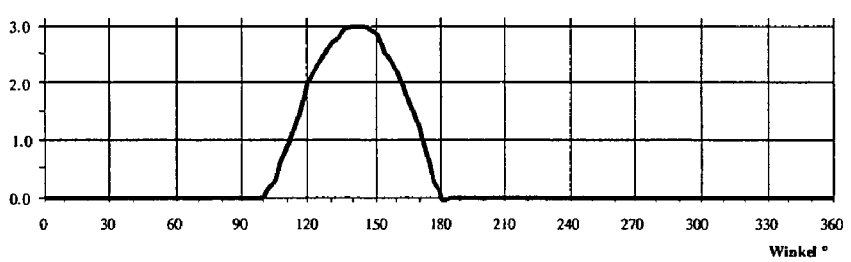
Figure 22D:
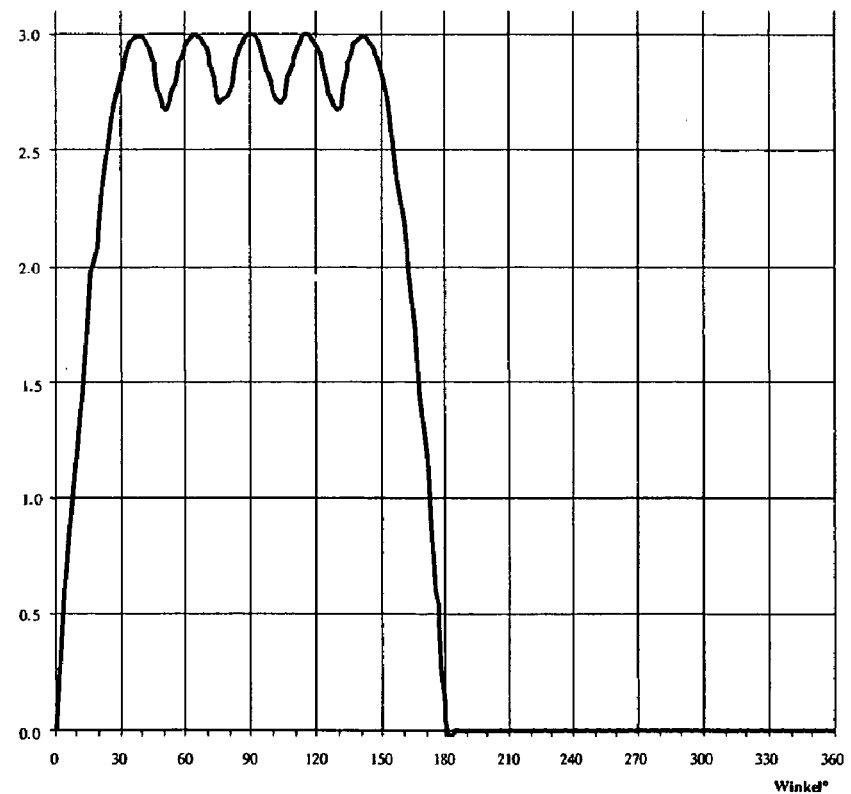
Figure 23A:
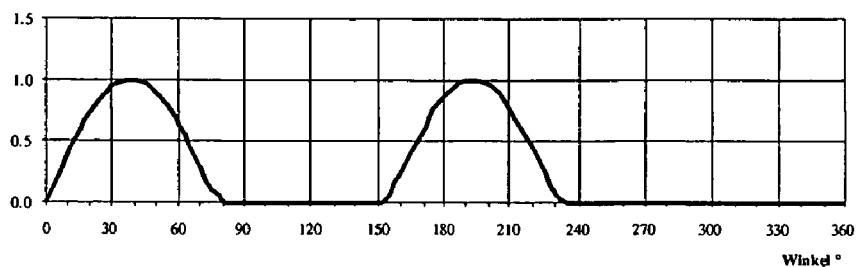
FIGS. 23a-d show the composition of a quasi-rectangular low ripple pulse for die sinking EDM on the basis of six partial pulses.
Figure 23B:
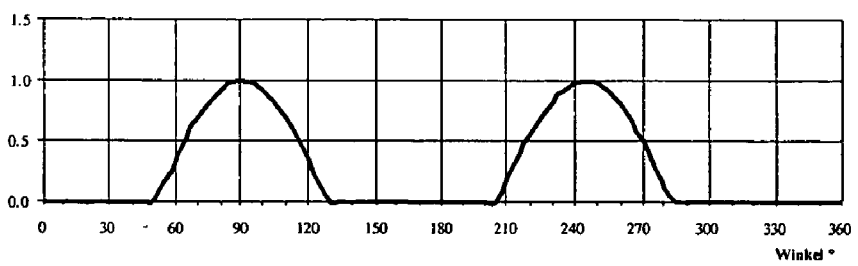
Figure 23C:
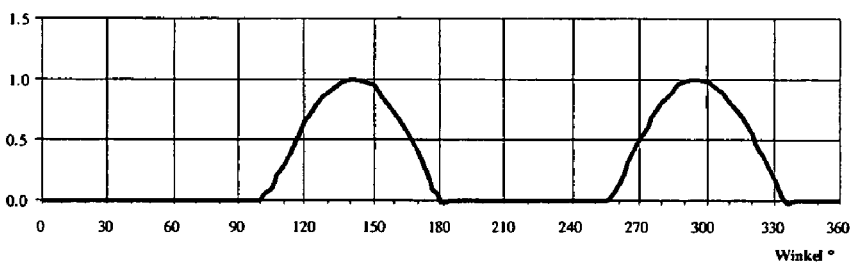
Figure 23D:
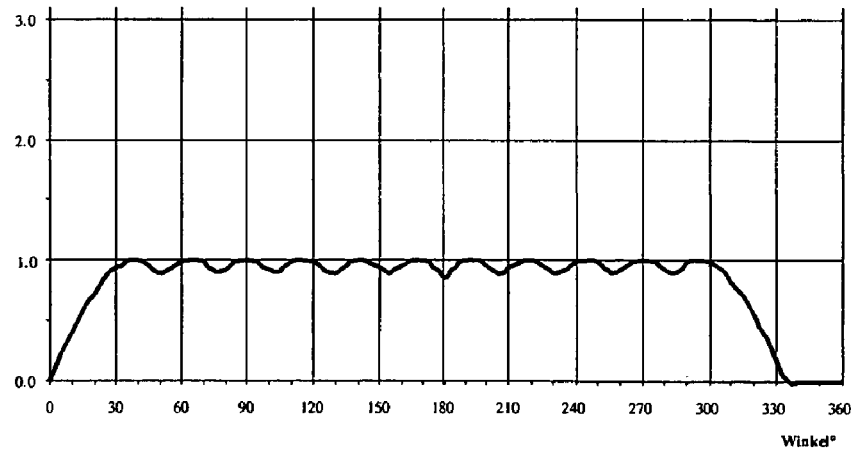
Figure 24A:
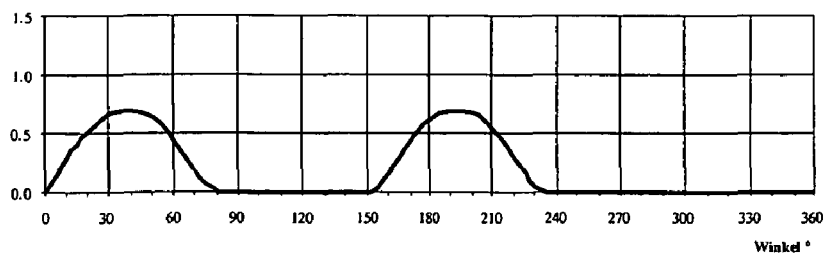
FIGS. 24a-e show the composition of a quasi-rectangular high ripple pulse for die sinking EDM on the basis of eight partial pulses.
Figure 24B:
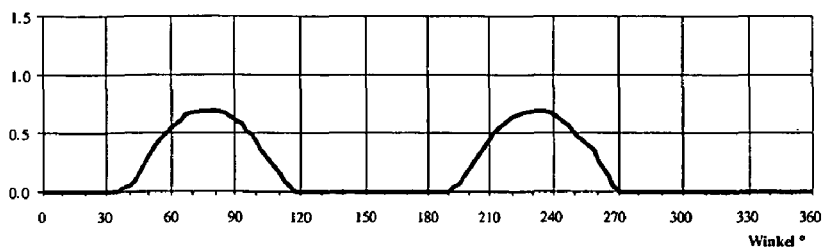
Figure 24C:
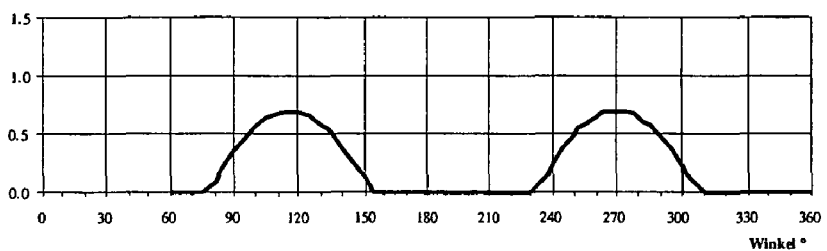
Figure 24D:
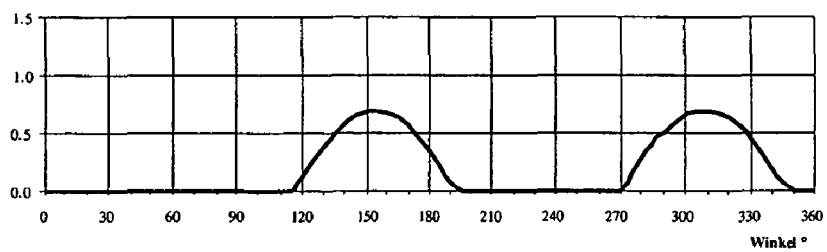
Figure 24E:
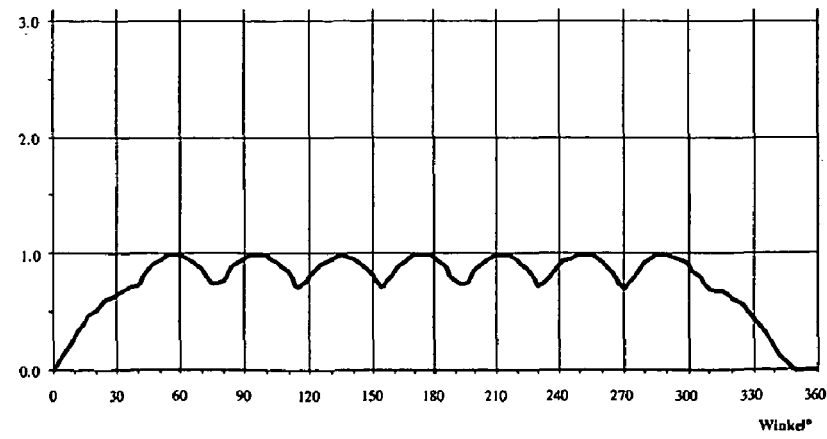
Figure 25A:
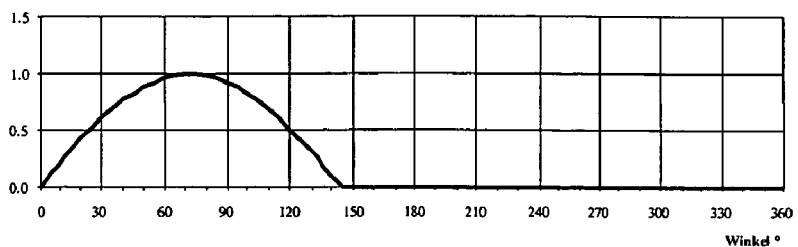
FIGS. 25a-e show the composition of a low ripple slow ON/fast OFF pulse for die sinking EDM on the basis of four partial pulses.
Figure 25B:
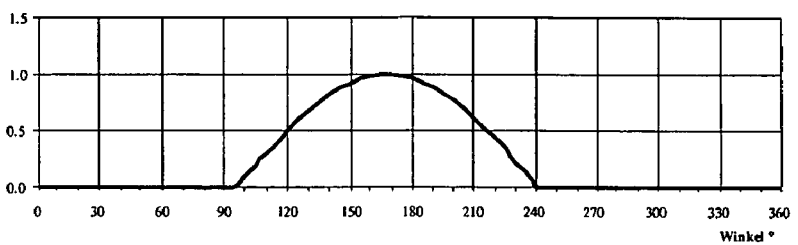
Figure 25C:
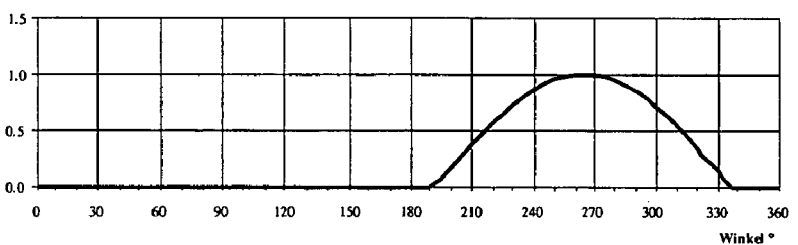
Figure 25D:
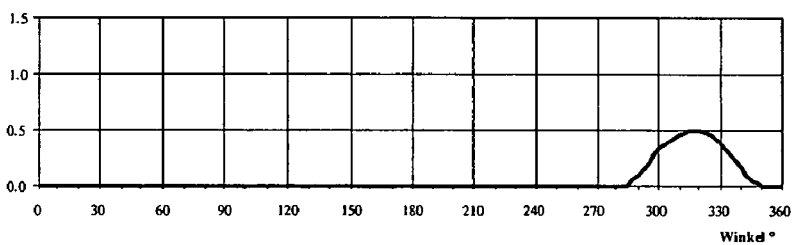
Figure 25E:
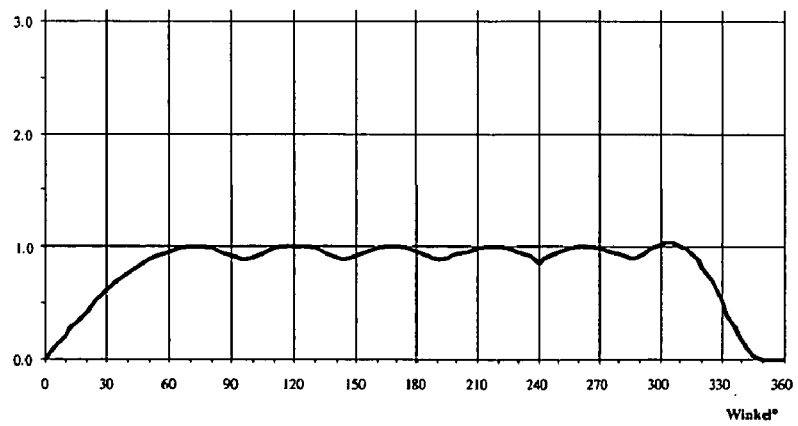
Figure 26A:
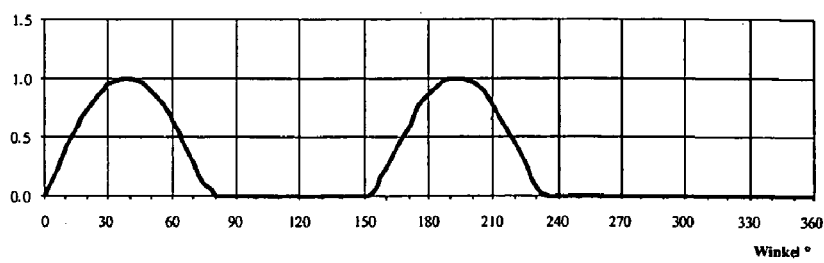
FIGS. 26a-e show the composition of a low ripple OFF overshoot pulse for die sinking EDM on the basis of seven partial pulses.
Figure 26B:
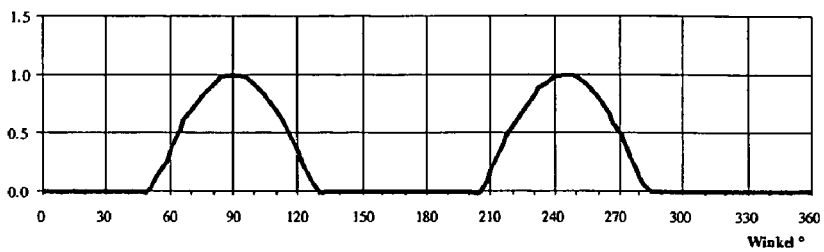
Figure 26C:
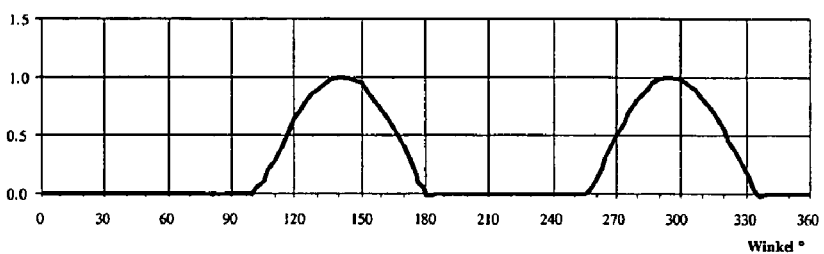
Figure 26D:
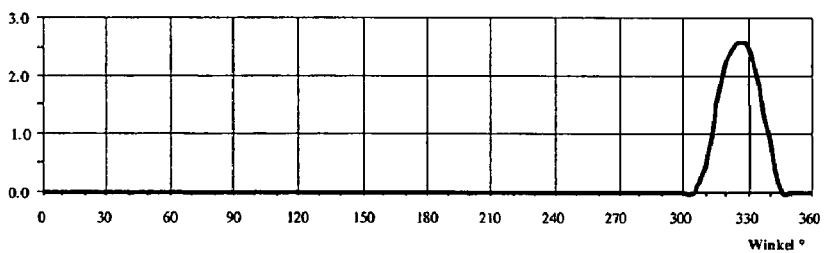
Figure 26E:
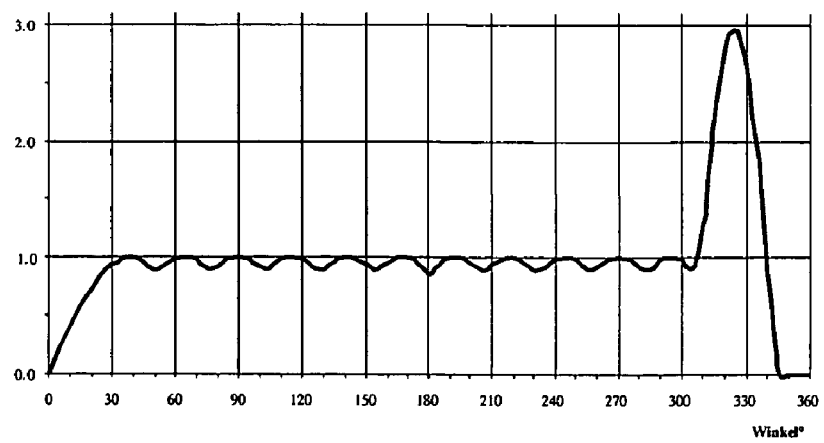

FIGS. 21a-d illustrate a pulse composition in which a pulse of duration ⅓ and amplitude 1.2 in FIG. 21c is added to the start and end of each of two pulses in synchronism with an amplitude 1.5 (could also be a single pulse with an amplitude of 3). Here, the area content is increased by 26% and the pulse rise from 0° to 30° is even 80% better than in the waveform shown in FIG. 19.

This pulse composition is oriented on the principle of harmonic analysis based on the Fourier series or wavelets theory and can be continued by further, ever shorter additional pulses having a certain reduced amplitude up to a near square wave discharge pulse. Here too there are, of course, natural limits where the improvements become negligible and the partial pulse durations become so short that the additional expense is no longer worthwhile. The wavelets theory is suitably for discontinuous signal shapes and is described in detail in "An Introduction to Wavelets" by Amara Graps under www.amara.com/IEEEwave/IEEEwavelet.html.

FIGS. 22a-d illustrate a further pulse composition for wire cutting based on the delay line principle. As evident from FIG. 22d, three pulses phase shifted by 120° with an amplitude of 3 result in a 29% larger pulse area and an 88% steeper leading edge better than in the waveform as shown in FIG. 19.

The advantages of larger pulse areas lie in the higher material removal rate per pulse. In addition, the steeper the pulse edges the higher the plasma temperature at the start of discharge and the stronger the cavitation effect at the end of discharge. Both phenomena reduce the damage to the surface of the work piece and likewise increase the material removal rate. The cavitation effect in EDM is understood to be an additional material removal mechanism as a result of which high implosion forces when the plasma channel implodes at the end of discharge which is all the more effective the quicker the pulse is turned off.

FIGS. 23a-d illustrate the synthesis of a discharge pulse for die sinking in which a discharge pulse is generated from 6 partial pulses each 120° phase shifted in accordance with the delay line principle, the ripple on the discharge pulse being only approximately 10.6%. For the sake of simplicity the ripple in % is expressed by the ratio $$\text{Ripple}[\%]=100*(I\text{max}-I\text{min})/I\text{max} \quad (4)$$

with Imax and Imin representing the maximal and minimal amplitudes, respectively, of the discharge current. It is interesting that the 10.6% ripple applies to each pulse amplitude. This is particularly of advantage for small pulse currents where known die sinking generators would be overtaxed because of the excessively high switching frequency for current regulation.

FIGS. 24a-e illustrate how the ripple of the discharge pulse can be influenced by diminishing (or increasing) the phase shift of the partial pulses. A phase shift of 90° results in a ripple of 27.3%. The amplitude then merely needs to be 0.7 to achieve a sum amplitude of 1.

The die sinking pulses as shown in FIGS. 23a-d and 24a-e might be optimised for best machining results; the leading edge being too steep (electrode wear) and the trailing edge too gentle (poor cavitation effect).

FIGS. 25a-e illustrate how to further optimise the discharge pulses. By a combination of the delay line principle with wider pulses and harmonic analysis or wavelet principle at the pulse end both of the aforementioned deficiencies can be eliminated. For even steeper pulse ends one or more harmonics could be additionally included in this case.

An interesting principle of enhancing the cavitation effect is described in SU 308 846. By a pulse overshoot at the end of the pulse, the material remove rate is significantly increased whilst achieving shallower cratering with the result of better roughness and a tighter gap width with the advantage of producing better quality work pieces in shorter time.

FIGS. 26a-e illustrate how such discharge pulses can be generated. In this case too, by modifying the phase shift of the partial pulses and their pulse durations, ripple and rise time of the discharge pulse can be freely dimensioned with the advantage, as compared to SU 308 846, of greater freedom in dimensioning the amplitude and duration of the pulse overshoot.

FIGS. 27a-e illustrate a novel pulse shape permitting a further enhancement of the cavitation effect. This novel pulse shape achieves a near perpendicular trailing edge at the end of the pulse with subsequent undershoot selectable in amplitude and duration in the opposite direction. However, to advantage, the duration of the undershoot is not selected too long so as not to cause unnecessary electrode wear. Too short a duration of the undershoot results in the discharge at the voltage zero crossover of the spark gap being extinguished from energy exhaustion prompting an inverted idle voltage after discharge. Such an inverted idle voltage may be of advantage when attempting to avoid electrolysis (corrosion of the work piece and oxyhydrogen formation) when employing aqueous dielectrics.

This example makes use of the flexibility in freely selecting polarity also during a partial pulse. The partial pulse at the end of the pulse (see FIG. 27d) is higher, shorter and opposite in polarity to that of the other partial pulses. Depending on how it relates to the other partial pulses (FIGS. 27a-c) the pulse capacitor 22 of this channel will have lost hardly any energy on discharge, indeed it can even gain energy, since it takes over part of the energy of these pulses. In other words, it also being possible to regain energy from the spark gap back into the generator.

Figure 27A:
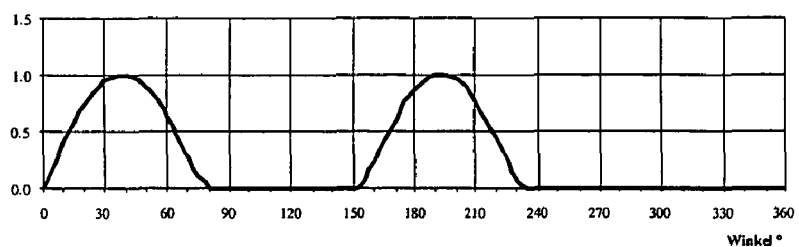
FIGS. 27a-e show the composition of a low ripple OFF undershoot pulse for die sinking EDM on the basis of seven partial pulses.
Figure 27B:
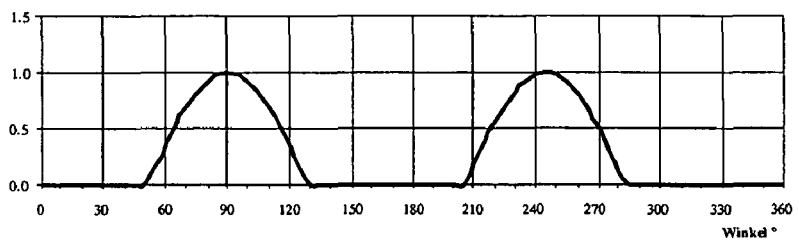
Figure 27C:
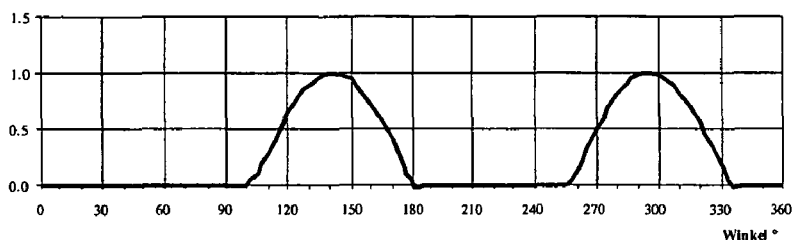
Figure 27D:
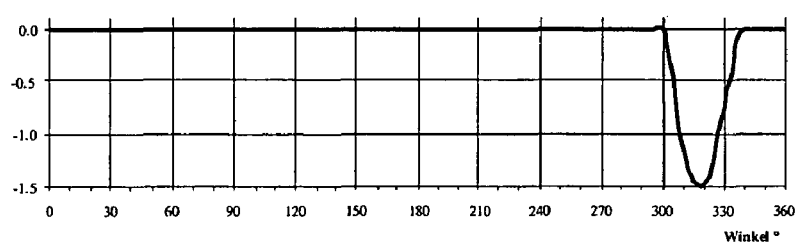
Figure 27E:
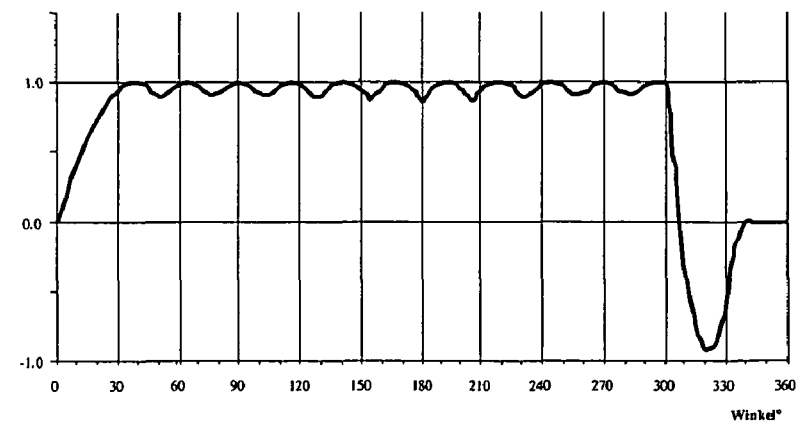

Equation (1) needs to be expanded for the recuperation case as follows:

$$U\_\text{end}=-U\_\text{chrg}-2*U\_\text{gap}*(2*t_R/T-1) \quad (5)$$

where $t_R$ (recuperation time) represents the time duration during which an inverted partial pulse (FIG. 27d) bucks the gap voltage U_gap. In other words, $t_R$ corresponds to the duration between start of the inverted partial pulse (FIG. 27d) and the point in time of zero crossover of the discharge pulse (FIG. 27a), T defines the duration of the inverted partial pulse (FIG. 27d).

When $t_R=0$ we again have the known equation as cited above. When $t_R=0.5$ T in all no energy is given off to the spark gap:

$$U\_\text{end}=-U\_\text{chrg} \quad (6)$$

And when $t_R=T$ the maximum energy from the spark gap is reflected back into the pulse capacitor 22:

$$U\_\text{end}=-U\_\text{chrg}-2*U\_\text{gap} \quad (7)$$

In these three extreme points the equation (5) is precise. For other intermediate values of $t_R$ their validity could still be demonstrated by a general differential equation. But for dimensioning the circuit these three extreme values are fully sufficient.

The excess charging voltage is reduced to the set value by correspondingly selecting the current direction to the bipolar current source (FIG. 7) and can thus be recuperated in the capacitors 8, 9. For the "recuperation" mode the diodes 12 and 13 could be replaced to advantage by switching elements (e.g. MOSFETs) which as an additional exploitation would result in enhanced efficiency in storing the energy in the inductances 14 and 15. The forward losses of a MOSFET type switching element can be maintained substantially smaller namely than those of a diode. In addition, the charge circuit 18 to 21 as shown in FIG. 8 could be configured for both current directions to permit the flow of energy in both directions.

Figure 28A:
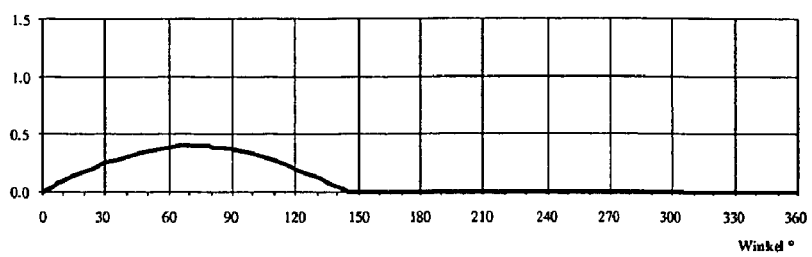
FIGS. 28a-e show the composition of a ramped fast OFF pulse for die sinking EDM on the basis of four partial pulses.
Figure 28B:
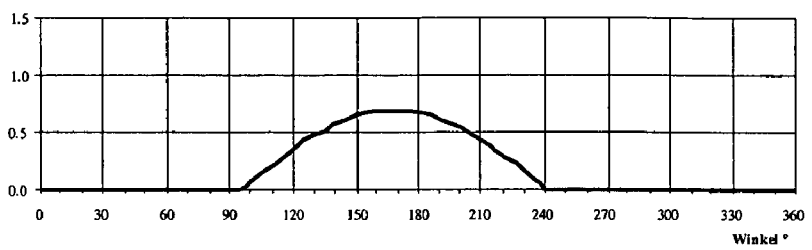
Figure 28C:
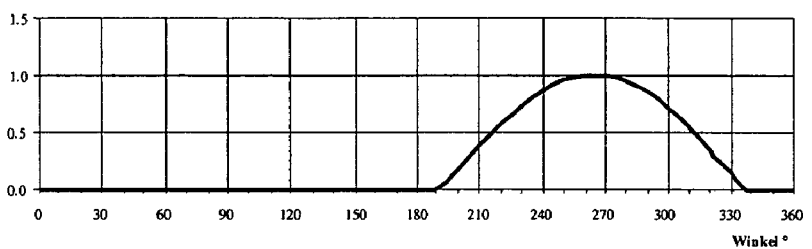
Figure 28D:
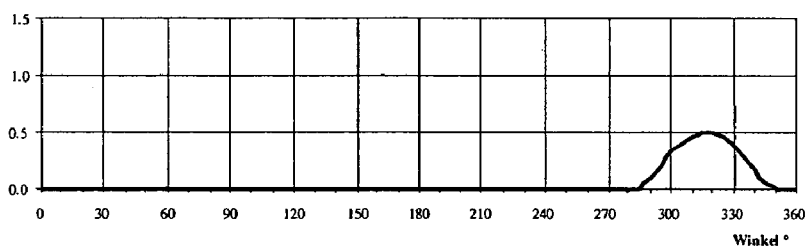
Figure 28E:
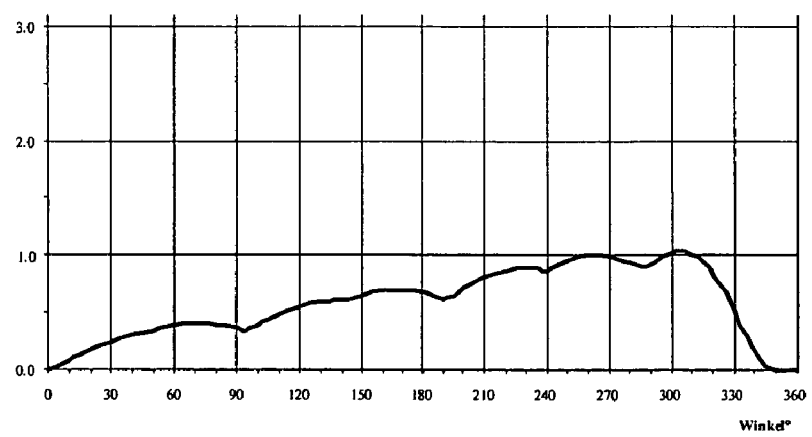

FIGS. 28a-e illustrate in general how the waveform of a discharge pulse can be arbitrarily modulated via the duration, amplitude and phase shift of the individual partial pulses in the form of sinusoidal half waves. FIG. 28a shows a first partial pulse with a duration of 144°, an amplitude of 0.4 which commences at 0°. FIG. 28b shows a second partial pulse with duration of 144°, an amplitude of 0.7 which is delayed by 96° and FIG. 28c shows a third pulse with duration of 144°, an amplitude of 1 and a delay of 192°. The fourth partial pulse in FIG. 28d having a duration of 60°, amplitude of 0.5 and delay of 287° has a shorter pulse duration and is tailored by the principle of harmonic analysis. As the result FIG. 28e shows a special erosion pulse whose amplitude increases linearly with the duration (low electrode wear) and a steep falling pulse edge (high material removal rate).

It is evident that the various single concepts as described above for shaping the pulse can be used in any desired combination. Although this adds to the complexity of the timing diagrams and set values for all switching elements and sensors of a generator module, they can be computed by the numerical control without the operator having to intervene in their programming.

In summary, one embodiment of a method and generator for generating a time sequence of discharge pulses for electrical discharge machining at least one pulse capacitor for generating the discharge pulse is charged with a charging voltage and then discharged into the spark gap. After its discharge the pulse capacitor is recharged with a charging voltage having the same polarity as that of the residual voltage still existing at the pulse capacitor after its discharge. The pulse capacitor is then discharged into the spark gap by a discharge pulse whose polarity is independent of the polarity of the charging voltage at the pulse capacitor after its recharge.

In a further embodiment of a method and generator for generating a time sequence of discharge pulses separated from each other by pulse pauses for electrical discharge machining at least two pulse capacitors are discharged each in the form of a partial pulse for forming together a discharge pulse into the spark gap. A discharge pulse having a predetermined waveform is selected from a plurality of discharge pulses having differing predetermined waveforms and the discharge of the two pulse capacitors is controlled such that the selected discharge pulse is generated with the predetermined waveform.

In a still further embodiment of a method and generator for generating a time sequence of EDM pulses having a predefined ignition voltage for electrical discharge machining an AC voltage is generated from a DC voltage furnished by a bipolar current source. The AC voltage is applied to an isolating transformer disposed between the bipolar current source and the spark gap. A pulse capacitor is charged by the bipolar current source to a charging voltage corresponding to the ignition voltage. The ignition voltage provided by the isolating transformer is switched with a selected polarity to the spark gap.

The methods and pulse generators described are suitable for all EDM machining. These generators can be transformed in a full configuration by a simple software configuration instruction into a die sinking generator or wire cutting generator. Selecting the polarity of the EDM pulses is done purely electronically and can thus change during a discharge pulse, or also differ from one pulse to the next in thus opening new technological horizons for the user. Due to their reduced power loss and higher output frequency the generator modules can be miniaturized so that they permit installing in the direct vicinity of the electrode in the machine. The pulse properties are no longer detriment by the cable system and in addition the power losses are now very much less for DC transmission with high voltage. This new principle permits the application of modern automated production methods for mass production of the modules, resulting in a tidy reduction in costs. This surface mount technology (SMT) method of production is based on the automated componenting of printed circuits with non-wired surface mounted devices (SMD).

The main field of application is thus the generation of well-defined pulses of all kinds for EMD with higher efficiency than with other known concepts. In all the EDM system as described above excels by higher flexibility in meeting customer requirements better and quicker whilst simplifying the implementation of all functions. Module production, testing and maintenance are compatible with international standards, requiring low material and production costs in maximizing the use of components of the system for both wire cutting and die sinking despite the differing requirements. In addition, the same modules can be put to use for high-end and low-end products as well as with application of standardized means of diagnosis for facilitated verification of increasingly more complex functions.

Since the increasing demands on ever higher productivity of EDM systems are continuously adding to the power requirement of pulse generators, the system as described above can put a stop to this trend in minimizing the losses in pulse generation, it even further reducing the losses in idle operation in the sense of a better environmental compatibility. In addition, the modules can be miniaturized to such an extent that they can now be located as best suited in satisfying their functions, due to the generators featuring high efficiency. The cable losses and cable system costs can now be reduced to an absolute minimum. The generator principle can be scaled over a broad power range and the configuration can now be configured so that variants and modifications are possible for any application without major complications and expense.

It is to be understood that the invention is not limited in its application to the details of construction and the arrangement of the components set forth in the above description of embodiments or illustrated in the drawings. The invention is capable of including other embodiments or being carried out for similar machine tools having the same function. Also, it is to be understood that the phraseology and terminology employed herein are for the purpose of description and should not be regarded as limiting.

All publications and existing systems mentioned in this specification are herein incorporated by reference.

Although certain devices and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

Accordingly, the protection sought is set forth in the claims below:

The invention claimed is:

1. A method of generating a time sequence of discharge pulses separated from each other by pulse pauses for electrical discharge machining wherein at least two pulse capacitors are discharged each in the form of a partial pulse into the spark gap for forming together a discharge pulse, a discharge pulse having a predetermined waveform is selected from a plurality of discharge pulses having differing predetermined waveforms and the discharge of said at least two pulse capacitors is controlled such that said selected discharge pulse is generated with said predetermined waveform, and each of the at least two pulse capacitors is discharged by means of an inverter circuit with a predetermined polarity for the corresponding partial pulse into the spark gap.

2. The method of claim 1 wherein the point in time of discharge, current amplitude, pulse duration and/or polarity of said partial pulses of said pulse capacitors are set such that said selected discharge pulse is generated with said predetermined waveform.

3. The method of claim 2 wherein the current amplitude of said partial pulses is set via the charge voltage, the capacitance of said individual pulse capacitors and/or via the value of an inductance.

4. The method of claim 2 wherein the pulse duration of said individual partial pulses is set via the capacitance of said individual pulse capacitors and/or via the value of an inductance.

5. The method of claim 2 wherein said polarity of said individual partial pulses is set by an isolating transformer and switching elements in an inverter configuration, wherein said polarity of said individual partial pulses are positive discharge pulses and negative discharge pulses.

6. The method of claim 1 wherein multiple pulse capacitors are discharged simultaneously into said spark gap.

7. The method of claim 1 wherein multiple pulse capacitors are discharged subsequently into said spark gap.

8. The method of claim 1 wherein said pulse capacitors are discharged in the form of sinusoidal half waves into said spark gap and a selected discharge pulse is generated having a predetermined waveform which differs from the waveform of a sinusoidal half wave.

9. The method of claim 1 wherein said current amplitude, pulse duration, polarity and point in time of discharge of each partial pulse are selected so that said predetermined waveform of said selected discharge pulse comprises at the end a current peak of opposite polarity to the remaining polarity of said discharge pulse of specific duration and specific amplitude.

10. The method of claim 1 wherein said capacitance, pulse duration and point in time of discharge of each partial pulse are selected so that the waveform of said selected discharge pulse approximates a square wave.

11. The method of claim 1 wherein said current amplitude, pulse duration, polarity and point in time of discharge of each partial pulse are selected so that said predetermined waveforms of said time sequence of discharge pulses each differ in form, duration, amplitude and/or polarity.

12. The method of claim 1 wherein said current amplitude, pulse duration and point in time of discharge of each partial pulse are selected so that said predetermined waveform of said selected discharge pulse comprises a predetermined rise time, a predetermined ripple and a predetermined fall time.

13. The method of claim 1 wherein said current amplitude, pulse duration and point in time of discharge of each partial pulse are selected so that said predetermined waveform of said selected discharge pulse comprises at its end a current peak of specific duration and specific amplitude.

14. A method of generating a time sequence of discharge pulses separated from each other by pulse pauses for electrical discharge machining wherein at least two pulse capacitors are discharged each in the form of a partial pulse into the spark gap for forming together a discharge pulse, a discharge pulse having a predetermined waveform is selected from a plurality of discharge pulses having differing predetermined waveforms and the discharge of said at least two pulse capacitors is controlled such that said selected discharge pulse is generated with said predetermined waveform, and each of the at least two pulse capacitors is discharged by means of an inverter circuit with a predetermined polarity for the corresponding partial pulse into the spark gap, wherein on occurrence of an excessive charge voltage at said pulse capacitors the excessive energy thereof is fed back via a current source into a DC voltage source.

15. A method of generating a time sequence of discharge pulses separated from each other by pulse pauses for electrical discharge machining wherein at least two pulse capacitors are discharged each in the form of a partial pulse into the spark gap for forming together a discharge pulse, a discharge pulse having a predetermined waveform is selected from a plurality of discharge pulses having differing predetermined waveforms and the discharge of said at least two pulse capacitors is controlled such that said selected discharge pulse is generated with said predetermined waveform, wherein said point in time of discharge and said current amplitude of each partial pulse are determined by means of harmonic analysis of said predetermined waveform of said selected discharge pulse.

16. A method of generating a time sequence of discharge pulses separated from each other by pulse pauses for electrical discharge machining wherein at least two pulse capacitors are discharged each in the form of a partial pulse into the spark gap for forming together a discharge pulse, a discharge pulse having a predetermined waveform is selected from a plurality of discharge pulses having differing predetermined waveforms and the discharge of said at least two pulse capacitors is controlled such that said selected discharge pulse is generated with said predetermined waveform, said capacitance, pulse duration and point in time of discharge of each partial pulse are selected so that the waveform of said selected discharge pulse approximates a square wave, wherein for generating said approximated square wave of said selected discharge pulse said point in time of discharge and said current amplitude of each partial pulse generating said discharge pulse are determined by means of a mathematical model of a delay line.

17. A generator for generating a time sequence of discharge pulses separated from each other by pulse pauses for electrical discharge machining, comprising at least two pulse capacitors for generating one partial pulse each, and coupled to said pulse capacitors a discharge controller which controls the discharge of said pulse capacitors such into a spark gap for forming together a discharge pulse, selecting means for selecting a discharge pulse having a predetermined waveform from a plurality of discharge pulses having differing predetermined waveforms, an inverter circuit coupled to the discharge controller and between each pulse capacitor and the spark gap which is controlled by the discharge controller such that the charging voltage present at the pulse capacitor is discharged with a predetermined polarity for the corresponding partial pulse into the spark gap, wherein said discharge controller controls the discharging of said at least two pulse capacitors such that said selected discharge pulse is generated having said predetermined waveform.

18. The generator according to claim 17 wherein said discharge controller sets said point in time of discharge, current amplitude, pulse duration and/or polarity of said partial pulses of said pulse capacitors such that said selected discharge pulse is generated with said predetermined waveform.

19. The generator according to claim 17 wherein the selecting means comprises a numerical control which stores said data sets for said discharge controller for generating said predetermined waveforms of said multiple discharge pulses in precomputed form and communicates said selected data set to said discharge controller.

20. The generator according to claim 17 which is arranged in the direct vicinity of said electrode and wherein the conductor connecting generator and work piece comprises a low stray inductance and high stray capacitance.

21. The generator according to claim 17 which comprises a controller in which the data sets for said predetermined waveforms of said multiple discharge pulses are stored and wherein said selecting means comprises a numerical control, said numerical control selecting one of said data sets in said controller.

22. The generator according to claim 17 wherein the selecting means comprises a numerical control which computes said data sets for said discharge controller for generating said predetermined waveforms of said multiple discharge pulses and communicates said selected data set to said discharge controller.

23. A generator for generating a time sequence of discharge pulses separated from each other by pulse pauses for electrical discharge machining, comprising at least two pulse capacitors for generating one partial pulse each, and coupled to said pulse capacitors a discharge controller which controls the discharge of said pulse capacitors into a spark gap for forming together a discharge pulse, selecting means for selecting a discharge pulse having a predetermined waveform from a plurality of discharge pulses having differing waveforms, wherein said discharge controller controls the discharging of said at least two pulse capacitors such that said selected discharge pulse is generated having said predetermined waveform, wherein said discharge controller comprises sensors for sensing said capacitor voltage at said pulse capacitors, a programmable digital circuit which receives signals from said sensors, a system interface which can configure said programmable digital circuit in bidirectional communication therewith and driver circuits which connect all switching elements provided for discharging said pulse capacitors to said programmable digital circuit.

24. A generator for generating a time sequence of discharge pulses separated from each other by pulse pauses for electrical discharge machining, comprising at least two pulse capacitors for generating one partial pulse each, and coupled to said pulse capacitors a discharge controller which controls the discharge of said pulse capacitors into a spark gap for forming together a discharge pulse, selecting means for selecting a discharge pulse having a predetermined waveform from a plurality of discharge pulses having differing waveforms, wherein said discharge controller controls the discharging of said at least two pulse capacitors such that said selected discharge pulse is generated having said predetermined waveform, which is arranged in the direct vicinity of said electrode and wherein the conductor connecting generator and work piece comprises a low stray inductance and high stray capacitance, wherein said controller is configured such that it multiplies all set values for said charge voltages of said pulse capacitors with a proportionality factor for changing the amplitude of a predetermined waveform.

* * * * *